(12) United States Patent
Jin et al.

(10) Patent No.: US 11,784,560 B2
(45) Date of Patent: Oct. 10, 2023

(54) POWER CONVERSION CIRCUIT

(71) Applicant: Delta Electronics, Inc., Taoyuan (TW)

(72) Inventors: Da Jin, Taoyuan (TW); Yahong Xiong, Taoyuan (TW); Litao Qian, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/842,629

(22) Filed: Jun. 16, 2022

(65) Prior Publication Data
US 2023/0020726 A1    Jan. 19, 2023

(30) Foreign Application Priority Data

Jul. 13, 2021   (CN) .......................... 202110789919.3

(51) Int. Cl.
*H02M 3/00*    (2006.01)
*H02M 3/158*   (2006.01)
*H02M 1/00*    (2006.01)
*H02M 3/07*    (2006.01)
*H02M 3/335*   (2006.01)

(52) U.S. Cl.
CPC ......... *H02M 3/015* (2021.05); *H02M 1/0095* (2021.05); *H02M 3/07* (2013.01); *H02M 3/1584* (2013.01); *H02M 3/003* (2021.05); *H02M 3/01* (2021.05); *H02M 3/33569* (2013.01)

(58) Field of Classification Search
CPC ........ H02M 3/01; H02M 3/015; H02M 3/003; H02M 3/07; H02M 3/1584; H02M 3/33569; H02M 1/0095
See application file for complete search history.

(56) References Cited

U.S. PATENT DOCUMENTS

| | | | |
|---|---|---|---|
| 2006/0028186 A1* | 2/2006 | Yan | H02M 3/155 323/225 |
| 2020/0358352 A1* | 11/2020 | Rizzolatti | H02M 3/01 |
| 2021/0184586 A1* | 6/2021 | Jin | H02M 3/158 |
| 2022/0255449 A1* | 8/2022 | Jin | H02M 3/01 |
| 2022/0255456 A1* | 8/2022 | Jin | H02M 3/33592 |

FOREIGN PATENT DOCUMENTS

| | | |
|---|---|---|
| CN | 102769377 B | 7/2014 |
| CN | 111711363 A | 9/2020 |

* cited by examiner

*Primary Examiner* — Jue Zhang
(74) *Attorney, Agent, or Firm* — KIRTON McCONKIE; Evan R. Witt

(57) ABSTRACT

A power conversion circuit includes an input positive terminal, an input negative terminal, an output positive terminal, an output negative terminal, a first switch bridge arm, a first resonant branch, a capacitor branch, an output inductor unit and an output capacitor. The input negative terminal is electrically connected with the output negative terminal. The first switch bridge arm is electrically connected between the input positive terminal and the input negative terminal. The first switch bridge arm includes a first switch, a second switch, a third switch and a fourth switch. The first switch and the second switch are electrically connected with a first node. The second switch and the third switch are electrically connected with a second node. The third switch and the fourth switch are electrically connected with a third node. The first resonant branch is electrically connected between the first node and the third node.

20 Claims, 12 Drawing Sheets

POWER CONVERSION CIRCUIT

CROSS-REFERENCE TO RELATED APPLICATION

This application claims priority to China Patent Application No. 202110789919.3, filed on Jul. 13, 2021, the entire contents of which are incorporated herein by reference for all purposes.

FIELD OF THE INVENTION

The present disclosure relates to a power conversion circuit, and more particularly to a power conversion circuit with lower power loss, higher operating efficiency and a wider gain range.

BACKGROUND OF THE INVENTION

With the advancement of Internet technologies, cloud computing technologies, electric vehicle technologies, industrial automation technologies and associated technologies, the demands for electric power gradually increase. In other words, the demands for power sources also increase. Consequently, the power conversion device has to be developed toward high power density and high efficiency. In order to meet the power requirements of high efficiency and high power density, the current industry practice is to increase the bus voltage in the power conversion device from 12V to 48V. Consequently, the current loss on the bus and the cost of the bus are reduced. However, a power conversion circuit needs to be added to the power conversion device to convert the 48V input voltage into 12V output voltage, which is provided for other loads.

In case that the input voltage is in the range between 36V and 75V (i.e., the rated voltage is 48V) and the output voltage is 12V or 5V, the conventional power conversion circuit usually uses a half-bridge circuit architecture. That is, the power conversion circuit includes a half-bridge switching circuit, a transformer and a synchronous rectifier circuit. The half-bridge switching circuit includes a bridge arm that includes an upper switch and a lower switch. The synchronous rectifier circuit includes two synchronous rectifying elements.

In the power conversion circuit of the conventional half-bridge circuit architecture, the on/off states of the upper switch and the lower switch are complementary to each other. Moreover, in order to avoid the arm-shot problem, the maximum duty cycle of the main switch (e.g., the upper switch) needs to be smaller than 0.5. Consequently, the range of the voltage gain change is narrow, and the conversion efficiency is low.

Therefore, there is a need of providing an improved power conversion circuit in order to overcome the drawbacks of the conventional technologies.

SUMMARY OF THE INVENTION

The present disclosure provides a power conversion circuit with lower power loss, higher operating efficiency and a wider gain range.

In accordance with an aspect of present disclosure, a power conversion circuit is provided. The power conversion circuit includes an input positive terminal, an input negative terminal, an output positive terminal, an output negative terminal, a first switch bridge arm, a first resonant branch, a capacitor branch, an output inductor unit and an output capacitor. The input negative terminal is electrically connected with the output negative terminal. The first switch bridge arm is electrically connected between the input positive terminal and the input negative terminal. The first switch bridge arm includes a first switch, a second switch, a third switch and a fourth switch, which are electrically connected with each other in series. The first switch and the second switch are electrically connected with a first node. The second switch and the third switch are electrically connected with a second node. The third switch and the fourth switch are electrically connected with a third node. The first resonant branch is electrically connected between the first node and the third node. The first resonant branch includes a first resonant capacitor and a first resonant inductor, which are connected with each other in series. The capacitor branch is electrically connected with the first switch bridge arm in parallel. The output inductor unit includes a first output inductor. The first output inductor is electrically connected with the third node and the output positive terminal. The output capacitor is electrically connected between the output positive terminal and the output negative terminal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of embodiments of this disclosure are presented herein for purpose of illustration and description only. It is not intended to be exhaustive or to be limited to the precise form disclosed.

Figure 1:
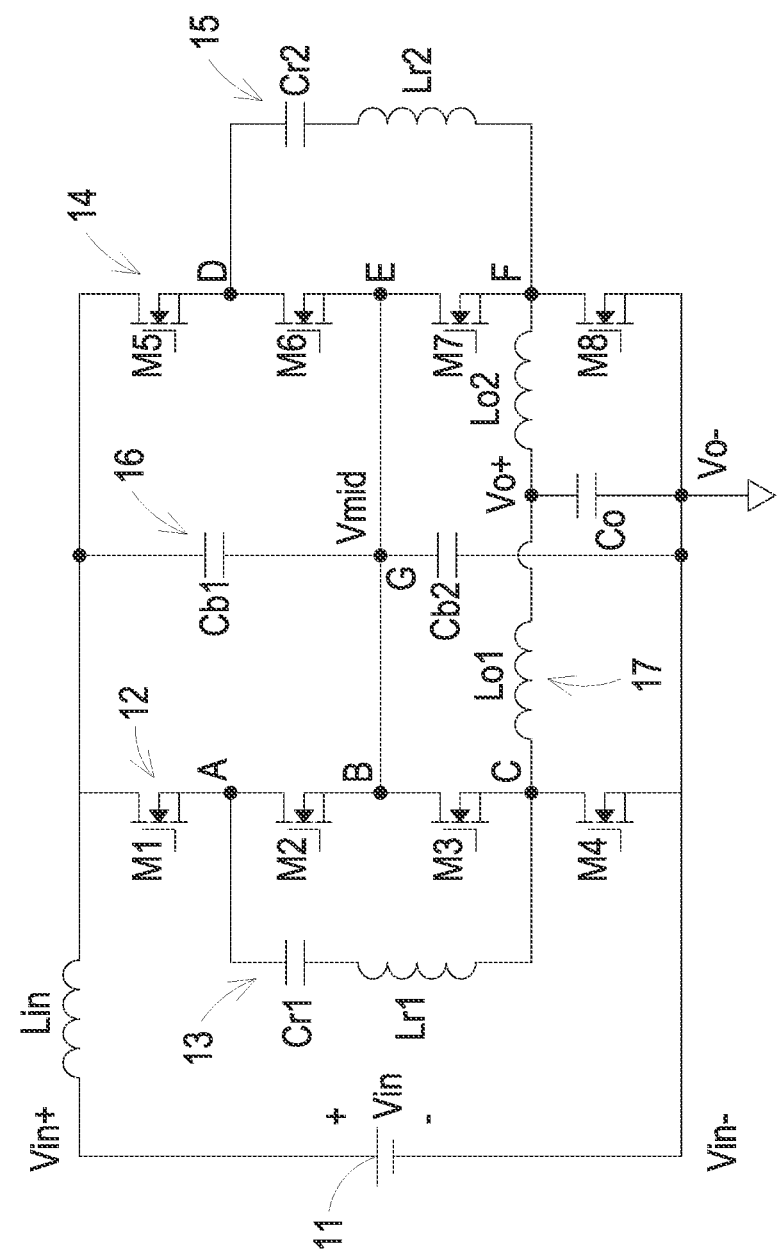
FIG. 1 is a schematic circuit diagram illustrating a power conversion circuit according to a first embodiment of the present disclosure.

FIG. 1 is a schematic circuit diagram illustrating a power conversion circuit according to a first embodiment of the present disclosure. In this embodiment, the power conversion circuit 1 is a resonant switch capacitor buck converter. The power conversion circuit 1 is electrically connected between a power source 11 and a load (not shown). The power conversion circuit 1 receives an input voltage Vin from the power source 11. The input voltage Vin is converted into an output voltage Vo by the power conversion circuit 1. The output voltage Vo is transmitted to the load. The power conversion circuit 1 includes an input positive terminal Vin+, an input negative terminal Vin−, an output positive terminal Vo+, an output negative terminal Vo−, an input inductor Lin, a first switch bridge arm 12, a first resonant branch 13, a second switch bridge arm 14, a second resonant branch 15, a capacitor branch 16, an output inductor unit 17 and an output capacitor Co. The input positive terminal Vin+ and the input negative terminal Vin− are electrically connected with the two terminals of the voltage source 11. The power conversion circuit 1 receives the input voltage Vin through the input positive terminal Vin+ and the input negative terminal Vin−. The output positive terminal Vo+ and the output negative terminal Vo− are electrically connected with the load. The output voltage Vo is outputted from the power conversion circuit 1 to the load through the output positive terminal Vo+ and the output negative terminal Vo−. The input negative terminal Vin− is electrically connected with the output negative terminal Vo−.

The first terminal of the input inductor Lin is electrically connected with the input positive terminal Vin+. The first switch bridge arm 12 is electrically connected between the second terminal of the input inductor Lin and the input negative terminal Vin−. The first switch bridge arm 12 includes a first switch M1, a second switch M2, a third switch M3 and a fourth switch M4, which are sequentially connected in series. The first switch M1 is electrically connected with the input positive terminal Vin+. The fourth switch M4 is electrically connected with the input negative terminal Vin−. The first switch M1 and the second switch M2 are electrically connected with a first node A. The second switch M2 and the third switch M3 are electrically connected with a second node B. The third switch M3 and the fourth switch M4 is electrically connected with a third node C. Preferably but not exclusively, the switches M1, M2, M3 and M4 of the first switch bridge arm 12 are MOSFET switches, GaN switches, FET switches or IGBT switches.

The first resonant branch 13 is electrically connected between the first node A and the third node C. Moreover, the first resonant branch 13 includes a first resonant capacitor Cr1 and a first resonant inductor Lr1, which are connected with each other in series.

The second switch bridge arm 14 is electrically connected between the second terminal of the input inductor Lin and the input negative terminal Vin−. The second switch bridge arm 14 includes a fifth switch M5, a sixth switch M6, a seventh switch M7 and an eighth switch M8, which are sequentially connected in series. The fifth switch M5 is electrically connected with the input positive terminal Vin+. The eighth switch M8 is electrically connected with the input negative terminal Vin−. The fifth switch M5 and the sixth switch M6 are electrically connected with a fourth node D. The sixth switch M6 and the seventh switch M7 are electrically connected with a fifth node E. The seventh switch M7 and the eighth switch M8 are electrically connected with a sixth node F. Preferably but not exclusively, the switches M5, M6, M7 and M8 of the second switch bridge arm 14 are MOSFET switches, GaN switches, FET switches or IGBT switches.

The second resonant branch 15 is connected between the fourth node D and the sixth node F. Moreover, the second resonant branch 15 includes a second resonant capacitor Cr2 and a second resonant inductor Lr2, which are connected with each other in series.

The capacitor branch 16 is connected with the first switch bridge arm 12 and the second switch bridge arm 14 in parallel. In this embodiment, the capacitor branch 16 is connected between the second terminal of the input inductor Lin and the input negative terminal Vin−. Moreover, the capacitor branch 16 includes a first half-bridge capacitor Cb1 and a second half-bridge capacitor Cb2, which are electrically connected with each other. The first half-bridge capacitor Cb1 and the second half-bridge capacitor Cb2 are electrically connected with a seventh node G. Moreover, the seventh node G, the second node B and the fifth node E are directly connected with each other. The voltage at the seventh node G is equal to a midpoint voltage Vmid.

The output inductor unit 17 is electrically connected between the third node C and the sixth node F. Moreover, the output inductor unit 17 includes a first output inductor Lo1 and a second output inductor Lo2. The first output inductor Lo1 is electrically connected between the third node C and the output positive terminal Vo+. The second output inductor Lo2 is electrically connected between the sixth node F and the output positive terminal Vo+.

The output capacitor Co is electrically connected between the output positive terminal Vo+ and the output negative terminal Vo−.

The power conversion circuit 1 further includes a control circuit (not shown). The control circuit issues driving signals to control the operations of the switches M1, M2, M3, M4, M5, M6, M7 and M8. These driving signals are PWM signals. According to the driving signals, the power conversion circuit 1 is capable of converting the input voltage Vin into the output voltage Vo. The power conversion circuit 1 is a buck circuit. The operations of the power conversion circuit 1 will be described in more details as follows.

Figure 2:
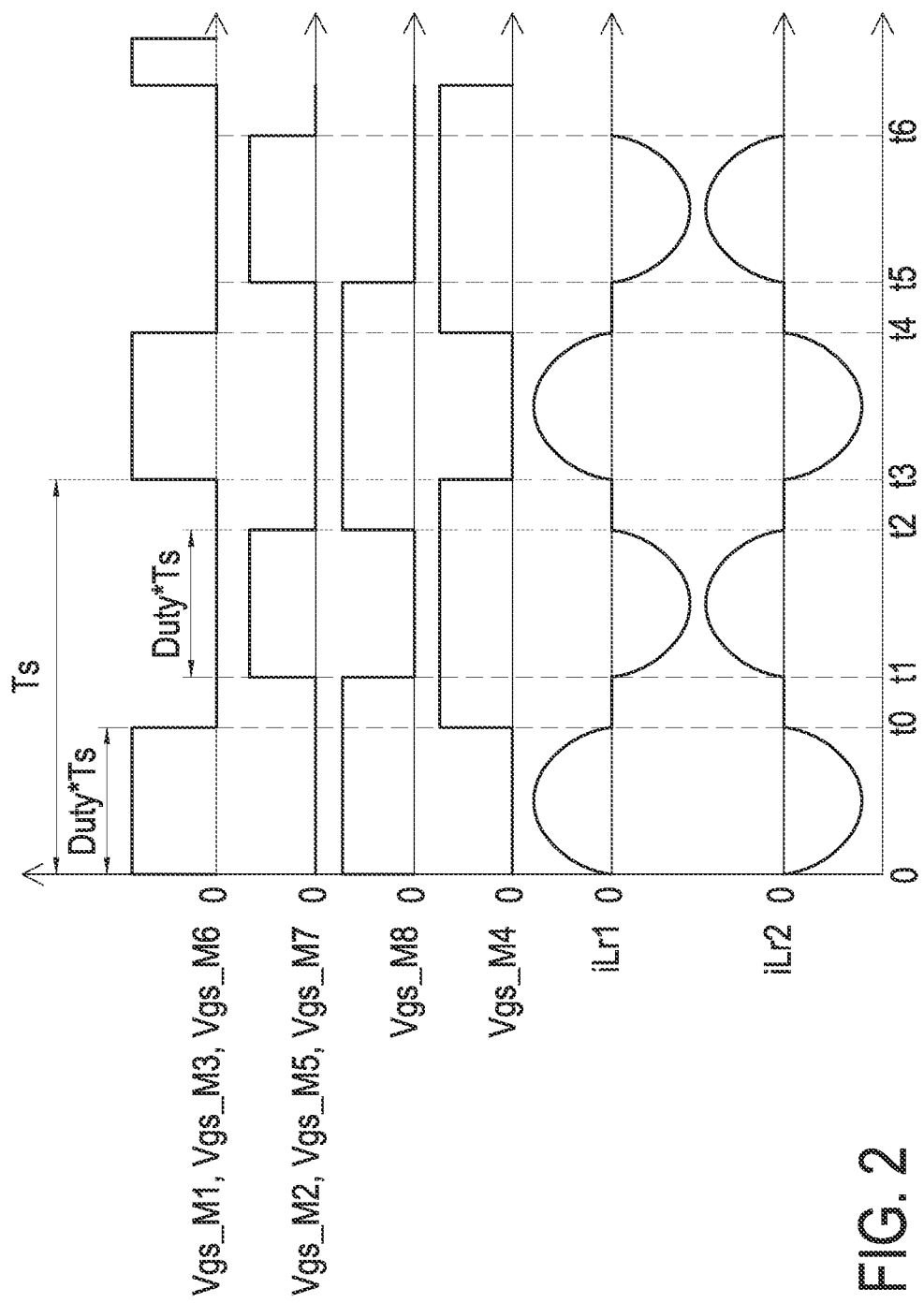
FIG. 2 is a first exemplary timing waveform diagram illustrating voltages and currents of associated components in the power conversion circuit as shown in FIG. 1.

FIG. 2 is a first exemplary timing waveform diagram illustrating voltages and currents of associated components in the power conversion circuit as shown in FIG. 1. In FIG. 2, Vgs_M1 denotes the gate-source voltage of the first switch M1, Vgs_M2 denotes the gate-source voltage of the second switch M2, Vgs_M3 denotes the gate-source voltage of the third switch M3, Vgs_M4 denotes the gate-source voltage of the fourth switch M4, Vgs_M5 denotes the gate-source voltage of the fifth switch M5, Vgs_M6 denotes the gate-source voltage of the sixth switch M6, Vgs_M7 denotes the gate-source voltage of the seventh switch M7, and Vgs_M8 denotes the gate-source voltage of the eighth switch M8. Moreover, iLr1 denotes the current flowing through the first resonant inductor Lr1, and iLr2 denotes the current flowing through the second resonant inductor Lr2.

As shown in FIG. 2, the time interval between the time point t=0 and the time point t3 is equal to one switching cycle Ts. The first switch M1, the third switch M3 and the sixth switch M6 receives a first driving signal. For example, these switches M1, M3 and M6 are MOSFET switches. The first driving signal corresponds to the voltages Vgs_M1, Vgs_M3 and Vgs_M6. Consequently, the one/off states of the switches M1, M3 and M6 are controlled according to the first driving signal. So that the first switch M1, the third switch M3 and the sixth switch M6 are turned on and turned off synchronously. The duty cycle (Duty) of the first driving signal is lower than or equal to 50%. That is, in any switching cycle, the on period of each of the switches M1, M3 and M6 is equal to Duty*Ts. The fourth switch M4 receives a second driving signal. For example, the fourth switch M4 is a MOSFET switch. The second driving signal corresponds to the voltages Vgs_M4. Consequently, the one/off states of the fourth switch M4 are controlled according to the second driving signal. The first driving signal and the second driving signal are complementary to each other. Moreover, the duty cycle of the second driving signal is equal to (1−Duty). That is, in any switching cycle, the on period of the switch M4 is equal to (1−Duty)*Ts. The second switch M2, the fifth switch M5 and the seventh switch M7 receive a third driving signal. For example, these switches M2, M5 and M7 are MOSFET switches. The third driving signal corresponds to the voltages Vgs_M2, Vgs_M5 and Vgs_M7. Consequently, the one/off states of the switches M2, M5 and M7 are controlled according to the third driving signal. So that the second switch M2, the fifth switch M5 and the seventh switch M7 are turned on and turned off synchronously. The duty cycle (Duty) of the third driving signal is lower than or equal to 50%. That is, in any switching cycle, the on period of each of the switches M2, M5 and M7 is equal to Duty*Ts. In this embodiment, the phase difference between the third driving signal and the first driving signal is 180 degrees. The eighth switch M8 receives a fourth driving signal. For example, the eighth switch M8 is a MOSFET switch. The fourth driving signal corresponds to the voltages Vgs_M8. Consequently, the one/off states of the eighth switch M8 are controlled according to the fourth driving signal. The third driving signal and the fourth driving signal are complementary to each other. Moreover, the duty cycle of the fourth driving signal is equal to (1−Duty). That is, in any switching cycle, the on period of the switch M8 is equal to (1−Duty)*Ts.

Please refer to the control method of FIG. 2 and the circuitry topology of FIG. 1. In the time interval between the time point t=0 and the time point t0, the first switch M1 and the third witch M3 are turned on. At this time, the first resonant branch 13 is electrically connected with the two terminals of the first half-bridge capacitor Cb1 of the capacitor branch 16 in parallel. Consequently, the first resonant branch 13 is charged by the voltage of the first half-bridge capacitor Cb1 of the capacitor branch 16. Moreover, a forward resonance between the first resonant capacitor Cr1 and the first resonant inductor Lr1 of the first resonant branch 13 occurs. The current iLr1 flowing through the first resonant inductor Lr1 starts to rise from zero (i.e., in a positive rising manner). Since the third switch M3 is turned on, the voltage difference between the two terminals of the first output inductor Lo1 is equal to the voltage difference between the midpoint voltage Vmid (i.e., the terminal voltage of the second half-bridge capacitor Cb2) and the output voltage Vo, i.e., Vmid−Vo. Consequently, the current flowing through the first output inductor Lo1 of the output inductor unit 17 is increased.

At the time point t0, the current iLr1 flowing through the first resonant inductor Lr1 is forwardly decreased to be close to zero. Meanwhile, the first switch M1 and the third switch M3 are turned off, and the fourth switch M4 is turned on. Consequently, through the freewheeling of the body diode of the second switch M2, the current iLr1 flowing through the first resonant inductor Lr1 is decreased to zero. When the current iLr1 flowing through the first resonant inductor Lr1 is equal to zero, the resonance between the first resonant capacitor Cr1 and the first resonant inductor Lr1 is stopped. Consequently, the current iLr1 flowing through the first resonant inductor Lr1 is maintained at zero. Since the fourth switch M4 is turned on, the voltage difference between the two terminals of the first output inductor Lo1 of the output inductor unit 17 is equal to −Vo. Consequently, the current flowing through the first output inductor Lo1 of the output inductor unit 17 is decreased. In the time interval between the time point t0 and the time point t1, the first switch M1 and the third switch M3 are turned off when the current iLr1 flowing through the first resonant inductor Lr1 is forwardly decreased to be close to zero or the current iLr1 flowing through the first resonant inductor Lr1 is forwardly decreased to zero. That is, the first switch M1 and the third switch M3 are turned off before the negative value of the current iLr1 is generated.

In the time interval between the time point t1 and the time point t2, the second switch M2 and the fourth switch M4 are turned on. At this time, the first resonant branch 13 is electrically connected with the two terminals of the second half-bridge capacitor Cb2 of the capacitor branch 16 in parallel. Consequently, the second half-bridge capacitor Cb2 of the capacitor branch 16 is discharged by the first resonant branch 13. Moreover, a resonant between the first resonant capacitor Cr1 and the first resonant inductor Lr1 of the first resonant branch 13 occurs. Consequently, the current iLr1 flowing through the first resonant inductor Lr1 starts to drop from zero (i.e., in a reverse rising manner). Moreover, since the fourth switch M4 is turned on, the current flowing through the first output inductor Lo1 of the output inductor unit 17 is continuously decreased.

At the time point t2, the current iLr1 flowing through the first resonant inductor Lr1 is reversely decreased to be close to zero. Meanwhile, the second switch M2 is turned off, and the fourth switch M4 is turned on. Consequently, through the freewheeling of the body diode of the first switch M1, the current iLr1 flowing through the first resonant inductor Lr1 is decreased to zero. When the current iLr1 flowing through the first resonant inductor Lr1 is equal to zero, the resonance between the first resonant capacitor Cr1 and the first resonant inductor Lr1 is stopped. Consequently, the current iLr1 flowing through the first resonant inductor Lr1 is maintained at zero. Since the fourth switch M4 is turned on, the voltage difference between the two terminals of the first output inductor Lo1 of the output inductor unit 17 is equal to −Vo. The current flowing through the first output inductor Lo1 of the output inductor unit 17 is continuously decreased. In the time interval between the time point t2 and the time point t3, the second switch M2 is turned off when the current iLr1 flowing through the first resonant inductor Lr1 is increased to be close to zero from negative value, or the current iLr1 flowing through the first resonant inductor Lr1 is increased to zero from negative value. That is, the second switch M2 is turned off before the positive value of the current iLr1 of the first resonant inductor Lr1 is generated.

After the time point t3, the fourth switch M4 is turned off, and the first switch M1 and the third switch M3 are turned on. Consequently, the new switching cycle is repeated.

As mentioned above, the current iLr1 flowing through the first resonant inductor Lr1 is controlled according to the switching sequence of the first switch M1, the second switch M2, the third switch M3 and the fourth switch M4. Similarly, the current iLr2 flowing through the second resonant inductor Lr2 is controlled according to the switching sequence of the fifth switch M5, the sixth switch M6, the seventh switch M7 and the eighth switch M8. The method of controlling the current iLr2 and the method of controlling the current iLr1 are in a duality relation.

In the time interval between the time point t=0 and the time point t0, the sixth switch M6 and the eighth switch M8 are turned on. At this time, the second resonant branch 15 is electrically connected with the two terminals of the second half-bridge capacitor Cb2 of the capacitor branch 16 in parallel. Moreover, a reverse resonance between the second resonant capacitor Cr2 and the second resonant inductor Lr2 of the second resonant branch 15 occurs. The current iLr2 flowing through the second resonant inductor Lr2 starts to drop from zero (i.e., in a reverse rising manner).

In the time interval between the time point t1 and the time point t2, the fifth switch M5 and the seventh switch M7 are turned on. At this time, the second resonant branch 15 is electrically connected with the two terminals of the first half-bridge capacitor Cb1 of the capacitor branch 16 in parallel. Moreover, a forward resonance between the second resonant capacitor Cr2 and the second resonant inductor Lr2 of the second resonant branch 15 occurs. The current iLr2 flowing through the second resonant inductor Lr2 starts to rise from zero (i.e., in a positive rising manner). The control method and operating principle of the second resonant branch 15 are similar to those of the first resonant branch 13, and not redundantly described herein.

Please refer to the circuitry topology of the power conversion circuit 1 as shown in FIG. 1 and the waveform diagram as shown in FIG. 2. During the operations of the power conversion circuit 1, the current iLr1 flowing through the first resonant inductor Lr1 and the current iLr2 flowing through the second resonant inductor Lr2 are discontinuous, and the duty cycle Duty is lower than or equal to 50%. The magnitude of the input voltage Vin is decreased to the midpoint voltage Vmid (i.e., the voltage at the seventh node G). Consequently, the midpoint voltage Vmid is equal to 0.5×Vin, and the output voltage Vo is equal to Vmid×Duty (or 0.5×Vin×Duty). That is, the magnitude of the output voltage Vo is lower than or equal to 0.25×Vin. Consequently, the voltage reduction efficacy of the power conversion circuit 1 is enhanced.

As mentioned above, the power conversion circuit 1 includes the first resonant inductor Lr1 and the second resonant inductor Lr2. The branch current of the first resonant branch 13 and the branch current of the second resonant branch 15 start to rise from zero in the forward or reverse direction. Consequently, the purposes of turning on the first switch M1 and the second switch M2 of the first switch bridge arm 12 under the zero current condition are achieved, and the purposes of turning on the fifth switch M5 and the sixth switch M6 of the second switch bridge arm 14 under the zero current condition are achieved. In this way, the turn-on loss of the first switch bridge arm 12 and the second switch bridge arm 14 will be reduced.

When the amplitude of the current flowing through the first resonant branch 13 is decreased to be close to zero, the first switch M1 or the second switch M2 is turned off. Moreover, when the amplitude of the current flowing through the second resonant branch 15 is decreased to be close to zero, the fifth switch M5 or the sixth switch M6 is turned off. Consequently, the purposes of turning off the first switch M1 and the second switch M2 of the first switch bridge arm 12 under the zero current condition are achieved, and the purposes of turning off the fifth switch M5 and the sixth switch M6 of the second switch bridge arm 14 under the zero current condition are achieved. In this way, the turn-off loss of the first switch bridge arm 12 and the second switch bridge arm 14 will be reduced.

As mentioned above, the first resonant branch 13 includes the first resonant inductor Lr1. Consequently, the capacitors with high capacitance can be used as the first half-bridge capacitor Cb1 and the second half-bridge capacitor Cb2. In addition, the first resonant branch 13 will not generate the inrush current when the on/off states of the switches are changed. Since the first half-bridge capacitor Cb1 and the second half-bridge capacitor Cb2 have the large capacitance, the first half-bridge capacitor Cb1 and the second half-bridge capacitor Cb2 can effectively provide the voltage clamping function to the first switch M1, the second switch M2, the third switch M3 and the fourth switch M4. Similarly, the second resonant branch 15 includes the second resonant inductor Lr2. Consequently, the capacitors with high capacitance can be used as the first half-bridge capacitor Cb1 and the second half-bridge capacitor Cb2. In addition, the second resonant branch 15 will not generate the inrush current when the on/off states of the switches are changed. Since the first half-bridge capacitor Cb1 and the second half-bridge capacitor Cb2 have the large capacitance, the first half-bridge capacitor Cb1 and the second half-bridge capacitor Cb2 can effectively provide the voltage clamping function to the fifth switch M5, a sixth switch M6, a seventh switch M7 and an eighth switch M8. Consequently, the switches with the low rated voltages can be used as the switches of the first switch bridge arm 12 and the switches of the second switch bridge arm 14. Since the conduction loss of the switches is reduced, the power loss of the power conversion circuit 1 is reduced, and the efficiency is enhanced.

The control method of the power conversion circuit 1 may be modified. In some embodiments, the purpose of increasing the output voltage is achieved by adjusting the duty cycle and the switching sequence.

Figure 3:
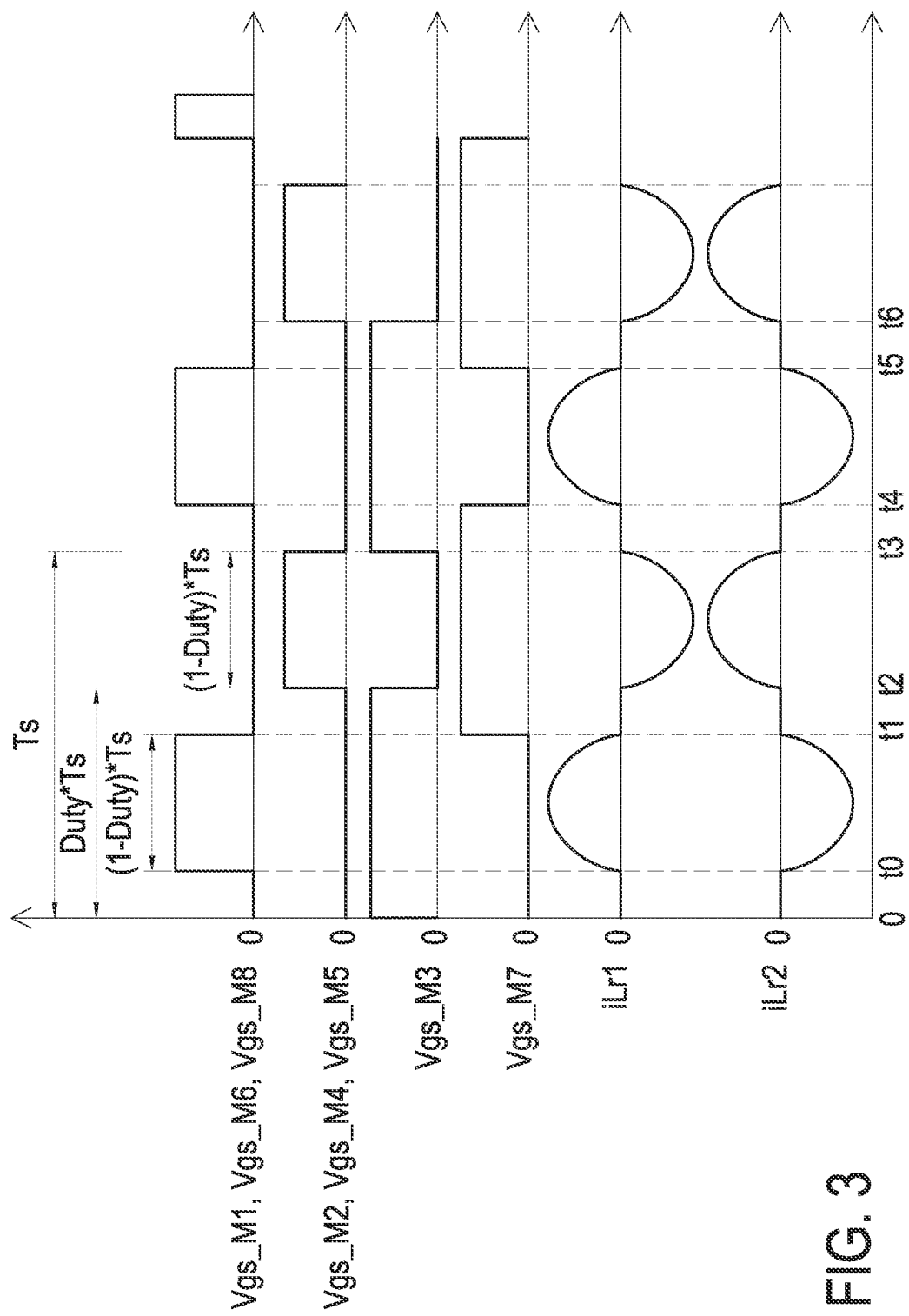
FIG. 3 is a second exemplary timing waveform diagram illustrating voltages and currents of associated components in the power conversion circuit as shown in FIG. 1.

FIG. 3 is a second exemplary timing waveform diagram illustrating voltages and currents of associated components in the power conversion circuit as shown in FIG. 1. As shown in FIG. 3, the time interval between the time point t=0 and the time point t3 is equal to one switching cycle Ts. The third switch M3 receives a first driving signal. For example, the third switch M3 is a MOSFET switch. The first driving signal corresponds to the voltage Vgs_M3. Consequently, the on/off states of the third switch M3 are controlled according to the first driving signal. The duty cycle (Duty) of the first driving signal is higher than 50%. That is, in any switching cycle, the on period of the third switch M3 is equal to Duty*Ts. The second switch M2, the fourth switch M4 and the fifth switch M5 receive a second driving signal. For example, the second switch M2, the fourth switch M4 and the fifth switch M5 are MOSFET switches. The second driving signal corresponds to the voltages Vgs_M2, Vgs_M4 and Vgs_M5. Consequently, the on/off states of the switches M2, M4 and M5 are controlled according to the second driving signal. So that the second switch M2, the fourth switch M4 and the fifth switch M5 are turned on and turned off synchronously. The first driving signal and the second driving signal are complementary to each other. Moreover, the duty cycle of the second driving signal is equal to (1−Duty). That is, in any switching cycle, the on period of each of the switches M2, M4 and M5 is equal to (1−Duty)*Ts. The seventh switch M7 receives a third driving signal. For example, the seventh switch M7 is a MOS- FET switch. The third driving signal corresponds to the voltage Vgs_M7. Consequently, the on/off states of the seventh switch M7 are controlled according to the third driving signal. The duty cycle (Duty) of the third driving signal is higher than 50%. That is, in any switching cycle, the on period of the seventh switch M7 is equal to Duty*Ts. The first switch M1, the sixth switch M6 and eighth switch M8 receive a fourth driving signal. For example, the first switch M1, the sixth switch M6 and eighth switch M8 are MOSFET switches. The fourth driving signal corresponds to the voltages Vgs_M1, Vgs_M6 and Vgs_M8. Consequently, the on/off states of the switches M1, M6 and M8 are controlled according to the fourth driving signal. So that the first switch M1, the sixth switch M6 and eighth switch M8 are turned on and turned off synchronously. The third driving signal and the fourth driving signal are complementary to each other. Moreover, the duty cycle of the fourth driving signal is equal to (1−Duty). That is, in any switching cycle, the on period of each of the switches M1, M6 and M8 is equal to (1−Duty)*Ts. In this embodiment, the phase difference between the fourth driving signal and the second driving signal is 180 degrees.

The control method of FIG. 3 is similar to the control method of FIG. 2. When both of the first switch M1 and the third switch M3 are turned on (e.g., in the time interval between the time point t0 and the time point t1), the first resonant branch 13 is charged by the voltage of the first half-bridge capacitor Cb1 of the capacitor branch 16. Moreover, a forward resonance between the first resonant capacitor Cr1 and the first resonant inductor Lr1 of the first resonant branch 13 occurs. The current iLr1 flowing through the first resonant inductor Lr1 starts to rise from zero to the peak value and then drops. When the current iLr1 is decreased to be close to zero, the first switch M1 is turned off. Meanwhile, the resonance between the first resonant capacitor Cr1 and the first resonant inductor Lr1 is stopped. Consequently, the current iLr1 flowing through the first resonant inductor Lr1 is maintained at zero.

When the third switch M3 is turned on (e.g., in the time interval between the time point t0 and the time point t2), the first output inductor Lo1 of the output inductor 17 extracts the current of the second half-bridge capacitor Cb2 through the third switch M3. When the third switch M3 is turned off and both of the second switch M2 and the fourth switch M4 are turned on (e.g., in the time interval between the time point t2 and the time point t3), the first output inductor Lo1 of the output inductor unit 17 freewheels through the fourth transistor M4. The second half-bridge capacitor Cb2 of the capacitor branch 16 is discharged by the first resonant branch 13. Moreover, a reverse resonance between the first resonant capacitor Cr1 and the first resonant inductor Lr1 of the first resonant branch 13 occurs. The current iLr1 flowing through the first resonant inductor Lr1 starts to drop from zero to the negative peak value and then rises. When the current iLr1 is increased to be close zero (e.g., in the time interval between the time point t3 and the time point t4), both of the second switch M2 and the fourth switch M4 are turned off and the third switch M3 is turned on. Meanwhile, the first output inductor Lo1 of the output inductor unit 17 extracts the current of the second half-bridge capacitor Cb2 through the third switch M3.

Then, a new switching cycle is repeated. The procedure of the new switching cycle will not be redundantly described herein. As mentioned above, the current iLr1 flowing through the first resonant inductor Lr1 is controlled according to the switching sequence of the first switch M1, the second switch M2, the third switch M3 and the fourth switch M4. Similarly, the current iLr2 flowing through the second resonant inductor Lr2 is controlled according to the switching sequence of the fifth switch M5, the sixth switch M6, the seventh switch M7 and the eighth switch M8. The method of controlling the current iLr2 and the method of controlling the current iLr1 are in a duality relation.

Please refer to the circuitry topology of the power conversion circuit 1 as shown in FIG. 1 and the waveform diagram as shown in FIG. 3. During the operations of the power conversion circuit 1, the current iLr1 flowing through the first resonant inductor Lr1 and the current iLr2 flowing through the second resonant inductor Lr2 are discontinuous, and the duty cycle (Duty) is lower than or equal to 50%. The magnitude of the input voltage Vin is decreased to the midpoint voltage Vmid (i.e., the voltage at the seventh node G). Consequently, the midpoint voltage Vmid is equal to 0.5×Vin, and the output voltage Vo is equal to Vmid×Duty (or 0.5×Vin×Duty). That is, the magnitude of the output voltage Vo is higher than 0.25×Vin. Since the magnitude of the output voltage Vo can be lower than or equal to 0.25×Vin or the magnitude of the output voltage Vo can be higher than 0.25×Vin, the output voltage range of the power conversion circuit 1 is widened.

As mentioned above, the power conversion circuit 1 includes the first resonant inductor Lr1 and the second resonant inductor Lr2. The branch current of the first resonant branch 13 and the branch current of the second resonant branch 15 start to rise from zero in the forward or reverse direction. When the amplitude of the current flowing through the first resonant branch 13 is decreased to zero, the first switch M1 or the second switch M2 is turned off. Moreover, when the amplitude of the current flowing through the second resonant branch 15 is decreased to zero, the fifth switch M5 or the sixth switch M6 is turned off. Consequently, the purposes of turning on the first switch M1 and the second switch M2 of the first switch bridge arm 12 under the zero current condition are achieved, the purposes of turning off the first switch M1 and the second switch M2 of the first switch bridge arm 12 under the zero current condition are achieved, the purposes of turning on the fifth switch M5 and the sixth switch M6 of the second switch bridge arm 14 under the zero current condition are achieved, and the purposes of turning off the fifth switch M5 and the sixth switch M6 of the second switch bridge arm 14 under the zero current condition are achieved. In this way, the turn-on loss and the turn-off loss of the first switch bridge arm 12 and the second switch bridge arm 14 will be reduced.

When the control method of FIG. 2 and the control method of FIG. 3 are applied to the power conversion circuit 1 of FIG. 1, two voltage reduction approaches can be achieved. In the first voltage reduction approach, the magnitude of the output voltage Vo is lower than or equal to 0.25×Vin. In the second voltage reduction approach, the magnitude of the output voltage Vo is higher than 0.25×Vin. Consequently, the range of the gain (i.e., the ratio of the output voltage Vo to the input voltage Vin) of the power conversion circuit 1 is wide. Moreover, even if the range of the input voltage Vin is wider, the output voltage Vo is still stabilized. For example, in case that the input voltage Vin is in the range between 40V and 60V and the output voltage Vo is 12V, the duty cycle (Duty) can be in the range between 0.4 and 0.6. Moreover, in case that the input voltage Vin is in the range between 36V and 75V and the output voltage Vo is 12V, the duty cycle (Duty) can be in the range between 0.32 and 0.67.

In the embodiments of FIG. 2 and FIG. 3, the current iLr1 flowing through the first resonant inductor Lr1 and the current iLr2 flowing through the second resonant inductor Lr2 are discontinuous during the operations of the power conversion circuit 1. In some embodiments, the current iLr1 flowing through the first resonant inductor Lr1 and the current iLr2 flowing through the second resonant inductor Lr2 are continuous.

Figure 4:
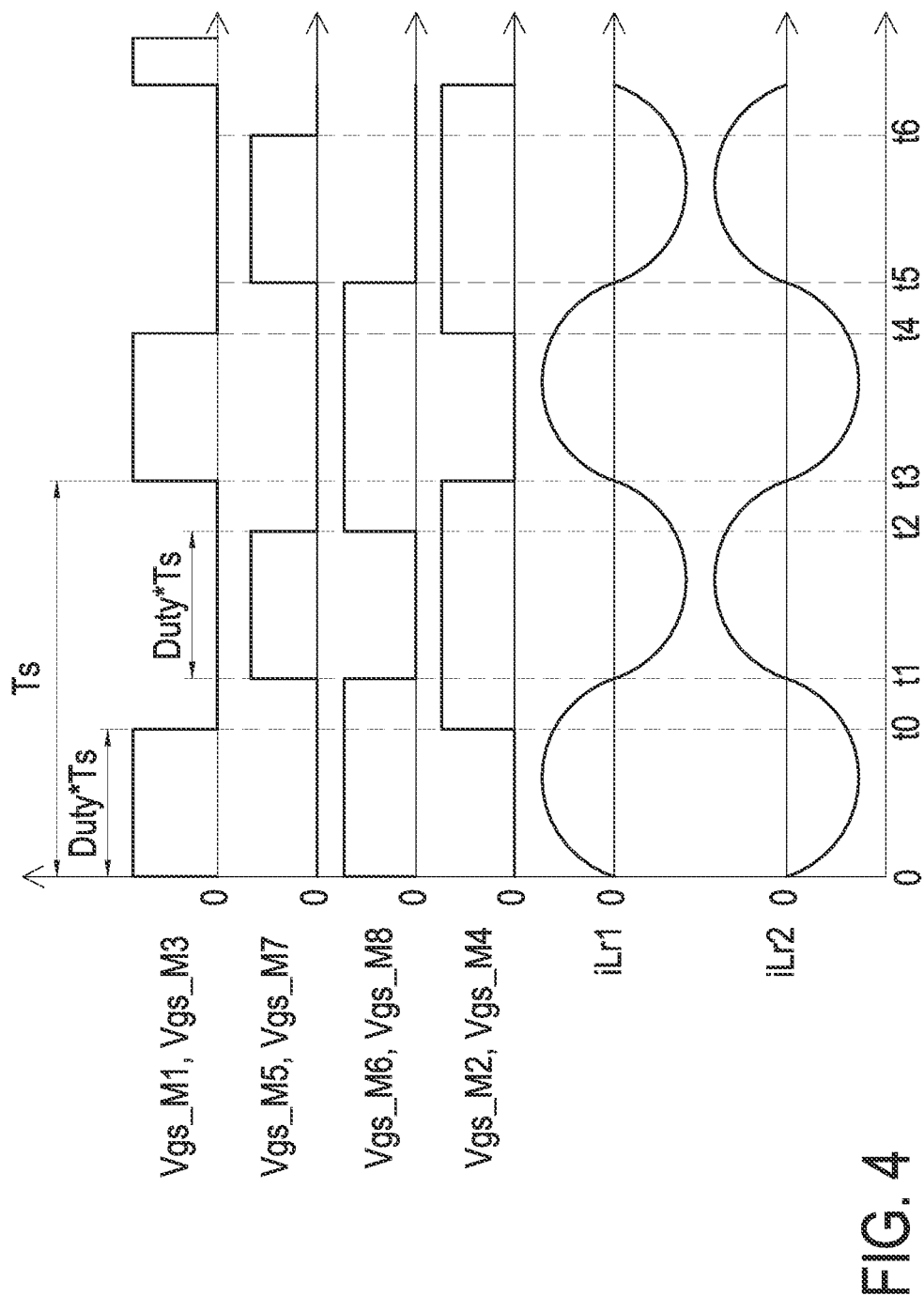
FIG. 4 is a third exemplary timing waveform diagram illustrating voltages and currents of associated components in the power conversion circuit as shown in FIG. 1.

FIG. 4 is a third exemplary timing waveform diagram illustrating voltages and currents of associated components in the power conversion circuit as shown in FIG. 1. As shown in FIG. 4, the time interval between the time point t=0 and the time point t3 is equal to on switching cycle Ts. The first switch M1 and third switch M3 receive a first driving signal. For example, the first switch M1 and third switch M3 are MOSFET switches. The first driving signal corresponds to the voltages Vgs_M1 and Vgs_M3. Consequently, the on/off states of the switches M1 and M3 are controlled according to the first driving signal. So that the first switch M1 and third switch M3 are turned on and turned off synchronously. The first driving signal has a duty cycle (Duty). That is, the on period of each of the switches M1 and M3 is equal to Duty*Ts. The second switch M2 and the fourth switch M4 receive the second driving signal. For example, the second switch M2 and the fourth switch M4 are MOSFET switches. The second driving signal corresponds to the voltages Vgs_M2 and Vgs_M4. Consequently, the on/off states of the switches M2 and M4 are controlled according to the second driving signal. So that the second switch M2 and the fourth switch M4 are turned on and turned off synchronously. Moreover, the duty cycle of the second driving signal is equal to (1−Duty). That is, in any switching cycle, the on period of each of the switches M2 and M4 is equal to (1−Duty)*Ts. The first driving signal and the second driving signal are complementary to each other. The fifth switch M5 and the seventh switch M7 receive a third driving signal. For example, the switches M5 and M7 are MOSFET switches. The third driving signal corresponds to the voltages Vgs_M5 and Vgs_M7. Consequently, the on/off states of the switches M5 and M7 are controlled according to the third driving signal. So that the fifth switch M5 and the seventh switch M7 are turned on and turned off synchronously. The third driving signal has the duty cycle (Duty). That is, in any switching cycle, the on period of each of the switches M5 and M7 is equal to Duty*Ts. In this embodiment, the phase difference between the third driving signal and the first driving signal is 180 degrees. The sixth switch M6 and eighth switch M8 receive a fourth driving signal. For example, the sixth switch M6 and eighth switch M8 are MOSFET switches. The fourth driving signal corresponds to the Vgs_M6 and Vgs_M8. Consequently, the on/off states of the switches M6 and M8 are controlled according to the fourth driving signal. So that the sixth switch M6 and eighth switch M8 are turned on and turned off synchronously. Moreover, the duty cycle of the fourth driving signal is equal to (1−Duty). That is, in any switching cycle, the on period of each of the switches M6 and M8 is equal to (1−Duty)*Ts. Moreover, the third driving signal and the fourth driving signal are complementary to each other.

The control method as shown in FIG. 4 is similar to the control method as shown in FIG. 3. When the first switch M1 and the third switch M3 are turned on, the first resonant branch 13 is charged by the voltage of the first half-bridge capacitor Cb1 of the capacitor branch 16. Moreover, a forward resonance between the first resonant capacitor Cr1 and the first resonant inductor Lr1 of the first resonant branch 13 occurs. The current iLr1 flowing through the first resonant inductor Lr1 starts to rise from zero to the positive peak value and then drops. When the on period Duty*Ts is ended (i.e., at the time point t2), the first switch M1 and the third switch M3 are turned off, and the second switch M2 and the fourth switch M4 are turned on. Meanwhile, the resonant current of the first resonant capacitor Cr1 and the first resonant inductor Lr1 continuously drops to zero through the second switch M2 and the fourth switch M4. Then, the reverse resonance occurs.

When the third switch M3 is turned on, the first output inductor Lo1 of the output inductor unit 17 extracts the current of the second half-bridge capacitor Cb2 through the third switch M3. When the first switch M1 and the third switch M3 are turned off and the second switch M2 and the fourth switch M4 are turned on, the first output inductor Lo1 of the output inductor unit 17 freewheels through the fourth switch M4. The second half-bridge capacitor Cb2 of the capacitor branch 16 is discharged by the first resonant branch 13. Moreover, a reverse resonance between the first resonant capacitor Cr1 and the first resonant inductor Lr1 of the first resonant branch 13 occurs. The current iLr1 flowing through the first resonant inductor Lr1 starts to drop from zero to the negative peak value and then rises. When the current iLr1 is increased to be close zero (e.g., in the time interval between the time point t3 and the time point t4), both of the second switch M2 and the fourth switch M4 are turned off, and the first switch M1 and the third switch M3 are turned on.

Then, a new switching cycle is repeated. The procedure of the new switching cycle will not be redundantly described herein. As mentioned above, the current iLr1 flowing through the first resonant inductor Lr1 is controlled according to the switching sequence of the first switch M1, the second switch M2, the third switch M3 and the fourth switch M4. Similarly, the current iLr2 flowing through the second resonant inductor Lr2 is controlled according to the switching sequence of controlling the fifth switch M5, the sixth switch M6, the seventh switch M7 and the eighth switch M8. The method of controlling the current iLr2 and the method of controlling the current iLr1 are in a duality relation.

Please refer to the circuitry topology of the power conversion circuit 1 as shown in FIG. 1 and the waveform diagram as shown in FIG. 4. The midpoint voltage Vmid is still equal to 0.5×Vin, and the output voltage Vo is equal to Vmid×Duty (or 0.5×Vin×Duty). During the operations of the power conversion circuit 1, the current iLr1 flowing through the first resonant inductor Lr1 and the current iLr2 flowing through the second resonant inductor Lr2 are continuous. When compared with the discontinuous currents iLr1 and iLr2 of FIG. 2 and FIG. 3, the current effective values of the first switch bridge arm 12 and the second switch bridge arm 14 in this embodiment will be decreased, and the turn-on loss of the first switch bridge arm 12 and the second switch bridge arm 14 will be reduced. When the current iLr1 flowing through the first resonant inductor Lr1 is increased to be close to zero, the switching cycle is equal to the resonant cycle of the first resonant capacitor Cr1 and the first resonant inductor Lr1 by the controlling method of turning off the second switch M2 and the fourth switch M4. Consequently, the purpose of turning off the second switch M2 under the zero current condition and the purpose of turning on the first switch M1 are achieved.

Figure 5:
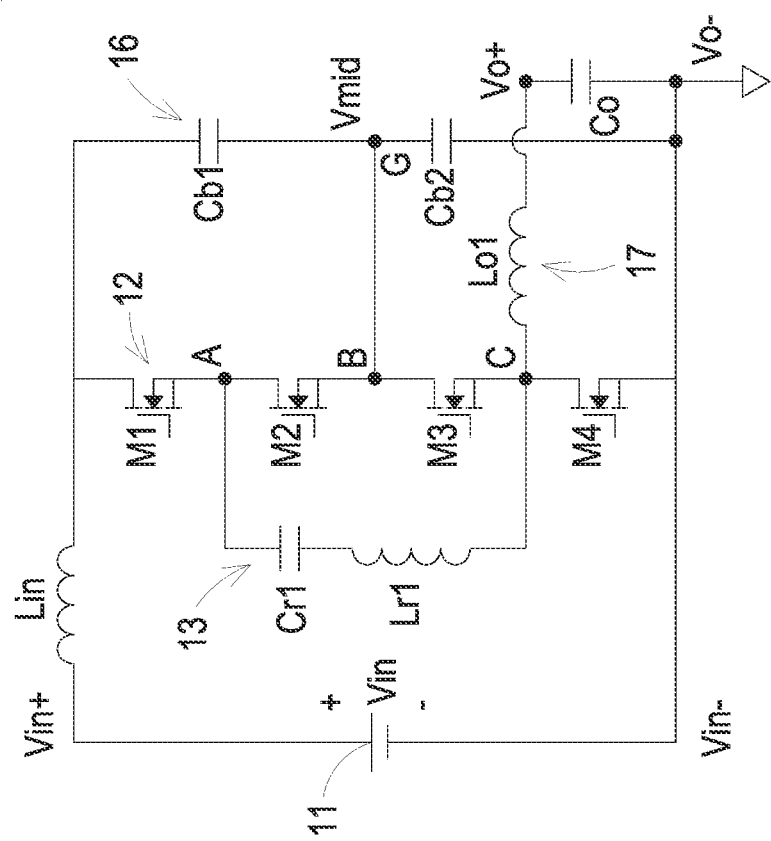
FIG. 5 is a schematic circuit diagram illustrating a power conversion circuit according to a second embodiment of the present disclosure.

In some embodiments, the power conversion circuit includes a single switch bridge arm, a single resonant branch and a single capacitor branch to control the current of a single output inductor. FIG. 5 is a schematic circuit diagram illustrating a power conversion circuit according to a second embodiment of the present disclosure. The circuitry topology of the power conversion circuit 1*a* of this embodiment is similar to that of the power conversion circuit 1 as shown in FIG. 1. In this embodiment, the power conversion circuit 1a includes an input positive terminal Vin+, an input negative terminal Vin−, an output positive terminal Vo+, an output negative terminal Vo−, an input inductor Lin, a first switch bridge arm 12, a first resonant branch 13, a capacitor branch 16, an output inductor unit 17 and an output capacitor Co. In comparison with FIG. 1, the power conversion circuit 1a of this embodiment omits the second switch bridge arm bridge 14 and the second resonant branch 15. The output inductor unit 17 of the power conversion circuit 1a of this embodiment includes a first output inductor Lo1 only. That is, the output inductor unit 17 of the power conversion circuit 1a omits the second output inductor Lo2. The other components of the power conversion circuit 1a of this embodiment are similar to those of the power conversion circuit 1, and not redundantly described herein.

Figure 6:
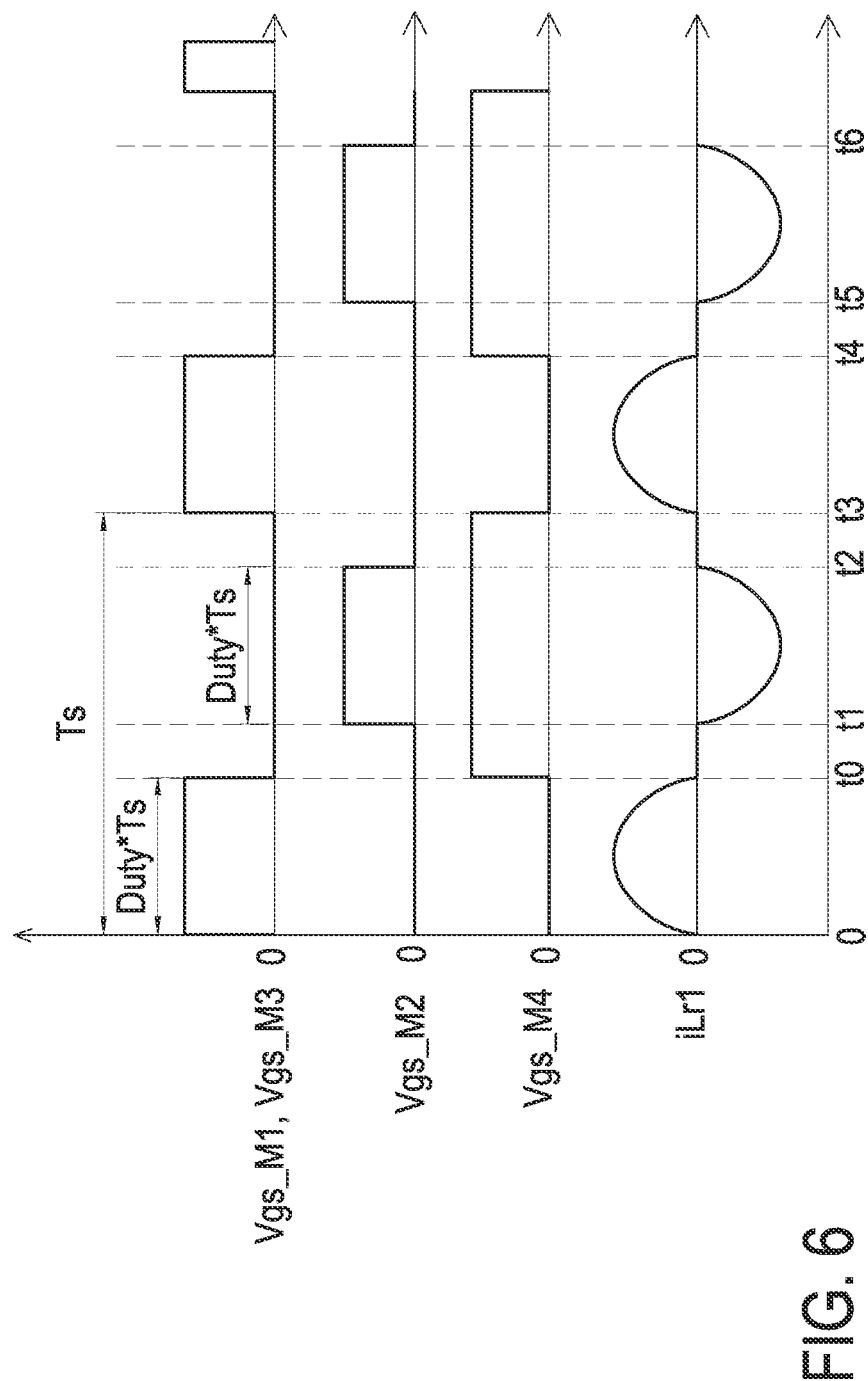
FIG. 6 is a schematic timing waveform diagram illustrating voltages and currents of associated components in the power conversion circuit as shown in FIG. 5.

FIG. 6 is a schematic timing waveform diagram illustrating voltages and currents of associated components in the power conversion circuit as shown in FIG. 5. In FIG. 6, Vgs_M1 denotes the gate-source voltage of the first switch M1, Vgs_M2 denotes the gate-source voltage of the second switch M2, Vgs_M3 denotes the gate-source voltage of the third switch M3, and Vgs_M4 denotes the gate-source voltage of the fourth switch M4. Moreover, iLr1 denotes the current flowing through the first resonant inductor Lr1.

As shown in FIG. 6, the time interval between the time point t=0 and the time point t3 is equal to on switching cycle Ts. The first switch M1 and third switch M3 receive a first driving signal. For example, the first switch M1 and third switch M3 are MOSFET switches. The first driving signal corresponds to the voltages Vgs_M1 and Vgs_M3. Consequently, the on/off states of the switches M1 and M3 are controlled according to the first driving signal. So that the first switch M1 and the third switch M3 are turned on and turned off synchronously. The duty cycle (Duty) of the first driving signal is lower than or equal to 50%. That is, in any switching cycle, the on period of each of the switches M1 and M3 is equal to Duty*Ts. The fourth switch M4 receives a second driving signal. For example, the fourth switch M4 is a MOSFET switch. The second driving signal corresponds to the voltage Vgs_M4. Consequently, the on/off states of the switch M4 are controlled according to the second driving signal. The first driving signal and the second driving signal are complementary to each other. Moreover, the duty cycle of the second driving signal is equal to (1−Duty). That is, in any switching cycle, the on period of the fourth switch M4 is equal to (1−Duty)*Ts. The second switch M2 receives a third driving signal. For example, the second switch M2 is a MOSFET switch. The third driving signal corresponds to the voltage Vgs_M2. Consequently, the on/off states of the second switch M2 are controlled according to the third driving signal. The duty cycle (Duty) of the third driving signal is lower than or equal to 50%. That is, in any switching cycle, the on period of the second switch M2 is equal to Duty*Ts. In this embodiment, the phase difference between the third driving signal and the first driving signal is 180 degrees.

Please refer to the control method of FIG. 6 and the circuitry topology of FIG. 5. In the time interval between the time point t=0 and the time point t0, the first switch M1 and the third witch M3 are turned on. At this time, the first resonant branch 13 is electrically connected in parallel with the two terminals of the first half-bridge capacitor Cb1 of the capacitor branch 16. Consequently, the first resonant branch 13 is charged by the voltage of the first half-bridge capacitor Cb1 of the capacitor branch 16. Moreover, a forward resonance between the first resonant capacitor Cr1 and the first resonant inductor Lr1 of the first resonant branch 13 occurs. The current iLr1 flowing through the first resonant inductor Lr1 starts to rise from zero (i.e., in a positive rising manner). Since the third switch M3 is turned on, the voltage difference between the two terminals of the first output inductor Lo1 is equal to the voltage difference between the midpoint voltage Vmid (i.e., the terminal voltage of the second half-bridge capacitor Cb2) and the output voltage Vo, i.e., Vmid−Vo. Consequently, the current flowing through the first output inductor Lo1 of the output inductor unit 17 increases.

At the time point t0, the current iLr1 flowing through the first resonant inductor Lr1 is forwardly decreased to be close to zero. Meanwhile, both of the first switch M1 and the third switch M3 are turned off, and the fourth switch M4 is turned on. Consequently, through the freewheeling of the body diode of the second switch M2, the current iLr1 flowing through the first resonant inductor Lr1 is decreased to zero. When the current iLr1 flowing through the first resonant inductor Lr1 is equal to zero, the resonance between the first resonant capacitor Cr1 and the first resonant inductor Lr1 is stopped. Consequently, the current iLr1 flowing through the first resonant inductor Lr1 is maintained at zero. Since the fourth switch M4 is turned on, the voltage difference between the two terminals of the first output inductor Lo1 of the output inductor unit 17 is equal to −Vo. Consequently, the current flowing through the first output inductor Lo1 of the output inductor unit 17 decreases. In the time interval between the time point t0 and the time point t1, the first switch M1 and the third switch M3 are turned off when the current iLr1 flowing through the first resonant inductor Lr1 is forwardly decreased to be close to zero or the current iLr1 flowing through the first resonant inductor Lr1 is forwardly decreased to zero. That is, the first switch M1 and the third switch M3 are turned off before the negative current iLr1 is generated.

In the time interval between the time point t1 and the time point t2, the second switch M2 and the fourth switch M4 are turned on. Meanwhile, the first resonant branch 13 is electrically connected with the two terminals of the second half-bridge capacitor Cb2 of the capacitor branch 16 in parallel. Consequently, the second half-bridge capacitor Cb2 of the capacitor branch 16 is discharged by the first resonant branch 13. Moreover, a resonance between the first resonant capacitor Cr1 and the first resonant inductor Lr1 of the first resonant branch 13 occurs. Consequently, the current iLr1 flowing through the first resonant inductor Lr1 starts to drop from zero (i.e., in a reverse rising manner). Moreover, since the fourth switch M4 is turned on, the current flowing through the first output inductor Lo1 of the output inductor unit 17 is continuously decreased.

At the time point t2, the current iLr1 flowing through the first resonant inductor Lr1 is reversely decreased to be close to zero. Meanwhile, the second switch M2 is turned off and the fourth switch M4 is turned on. Consequently, through the freewheeling of the body diode of the first switch M1, the current iLr1 flowing through the first resonant inductor Lr1 is decreased to zero. When the current iLr1 flowing through the first resonant inductor Lr1 is equal to zero, the resonance between the first resonant capacitor Cr1 and the first resonant inductor Lr1 is stopped. Consequently, the current iLr1 flowing through the first resonant inductor Lr1 is maintained at zero. Since the fourth switch M4 is turned on, the voltage difference between the two terminals of the first output inductor Lo1 of the output inductor unit 17 is equal to −Vo. The current flowing through the first output inductor Lo1 of the output inductor unit 17 is continuously decreased.

In the time interval between the time point t2 and the time point t3, the second switch M2 is turned off when the current iLr1 flowing through the first resonant inductor Lr1 is forwardly increased to be close to zero or the current iLr1 flowing through the first resonant inductor Lr1 is forwardly increased to zero. That is, the second switch M2 is turned off before the positive current iLr1 of the first resonant inductor Lr1 is generated.

After the time point t3, the fourth switch M4 is turned off, and the first switch M1 and the third switch M3 are turned on. Then, a new switching cycle is repeated. The procedure of the new switching cycle will not be redundantly described herein.

By using the above control method, the current flowing through the first output inductor can be controlled. Consequently, the voltage reduction efficacy of the power conversion circuit 1a is enhanced. Under this circumstance, the switches with the low rated voltages can be used. Since the conduction loss of the switches is reduced, the power loss of the power conversion circuit 1a is reduced, and the efficiency is enhanced. It is noted that the control method for the power conversion circuit 1a is not restricted. For example, the control method of FIG. 3 or the control method of FIG. 4 can be applied to the power conversion circuit 1a.

For improving the performance of the power conversion circuit, a plurality of output inductors can be coupled with each other to form a coupled inductor, and a single magnetic device is used as the coupled inductor. Consequently, the core loss is reduced, the equivalent steady-state inductance is increased, and the equivalent dynamic inductance is reduced.

Figure 7:
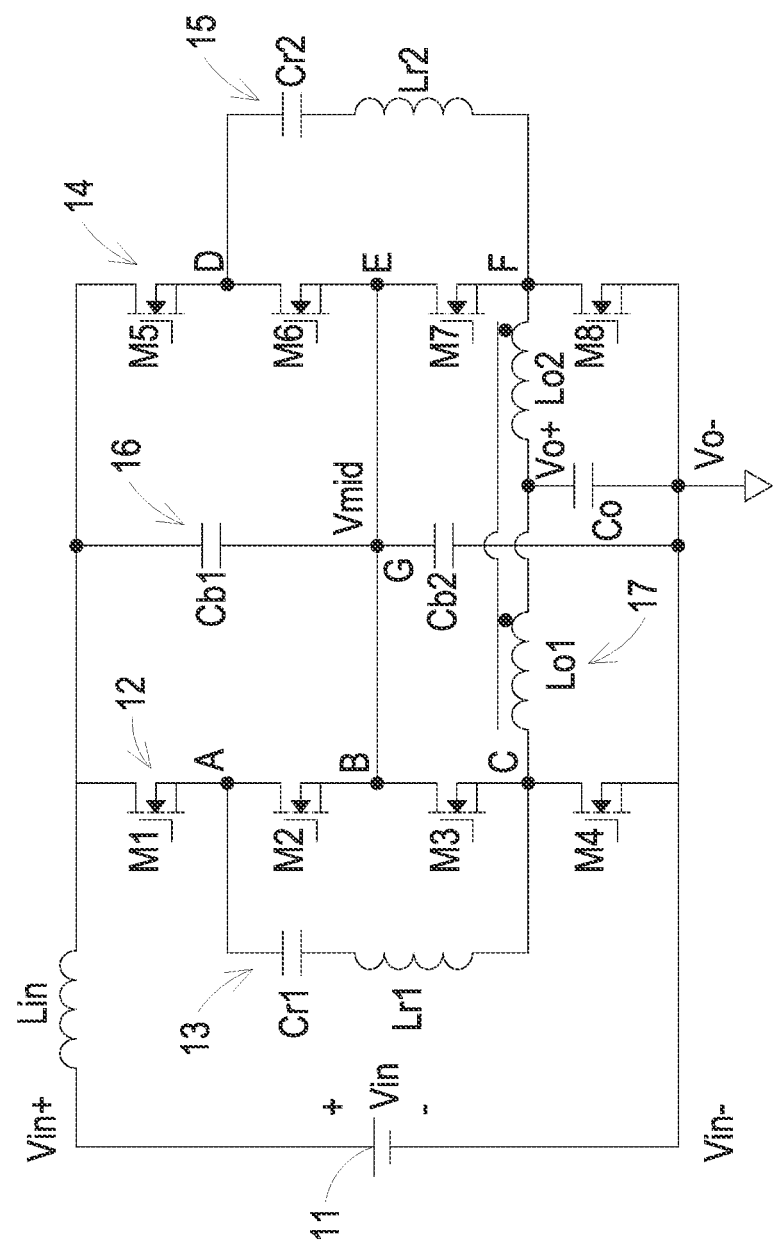
FIG. 7 is a schematic circuit diagram illustrating a power conversion circuit according to a third embodiment of the present disclosure.

FIG. 7 is a schematic circuit diagram illustrating a power conversion circuit according to a third embodiment of the present disclosure. The circuitry topology of the power conversion circuit 1b of this embodiment is similar to that of the power conversion circuit 1 as shown in FIG. 1. In comparison with the power conversion circuit 1, the first output inductor Lo1 and the second output inductor Lo2 in the power conversion circuit 1b of this embodiment are coupled as a coupled inductor. In addition, the phase difference between the voltage at the third node C and the voltage at the sixth node F is 180 degrees. The voltage at the third node C is applied to the input terminal of the first output inductor Lo1. The voltage at the sixth node F is applied to the input terminal of the second output inductor Lo2. Consequently, the core loss is reduced, the equivalent steady-state inductance is increased, and the equivalent dynamic inductance is reduced.

The structure of the magnetic device as the coupled inductor of the power conversion circuit 1b will be described as follows.

Figure 8:
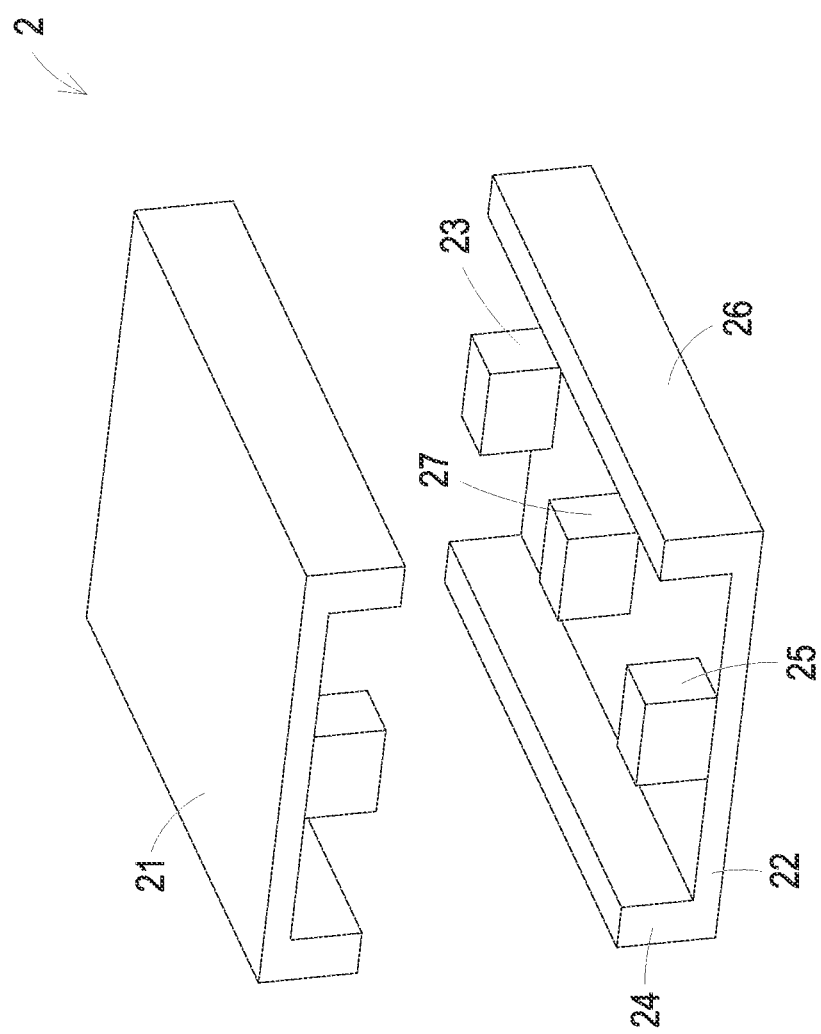
FIG. 8 is a schematic exploded view illustrating a portion of a magnetic device of the power conversion circuit as shown in FIG. 7.
Figure 9:
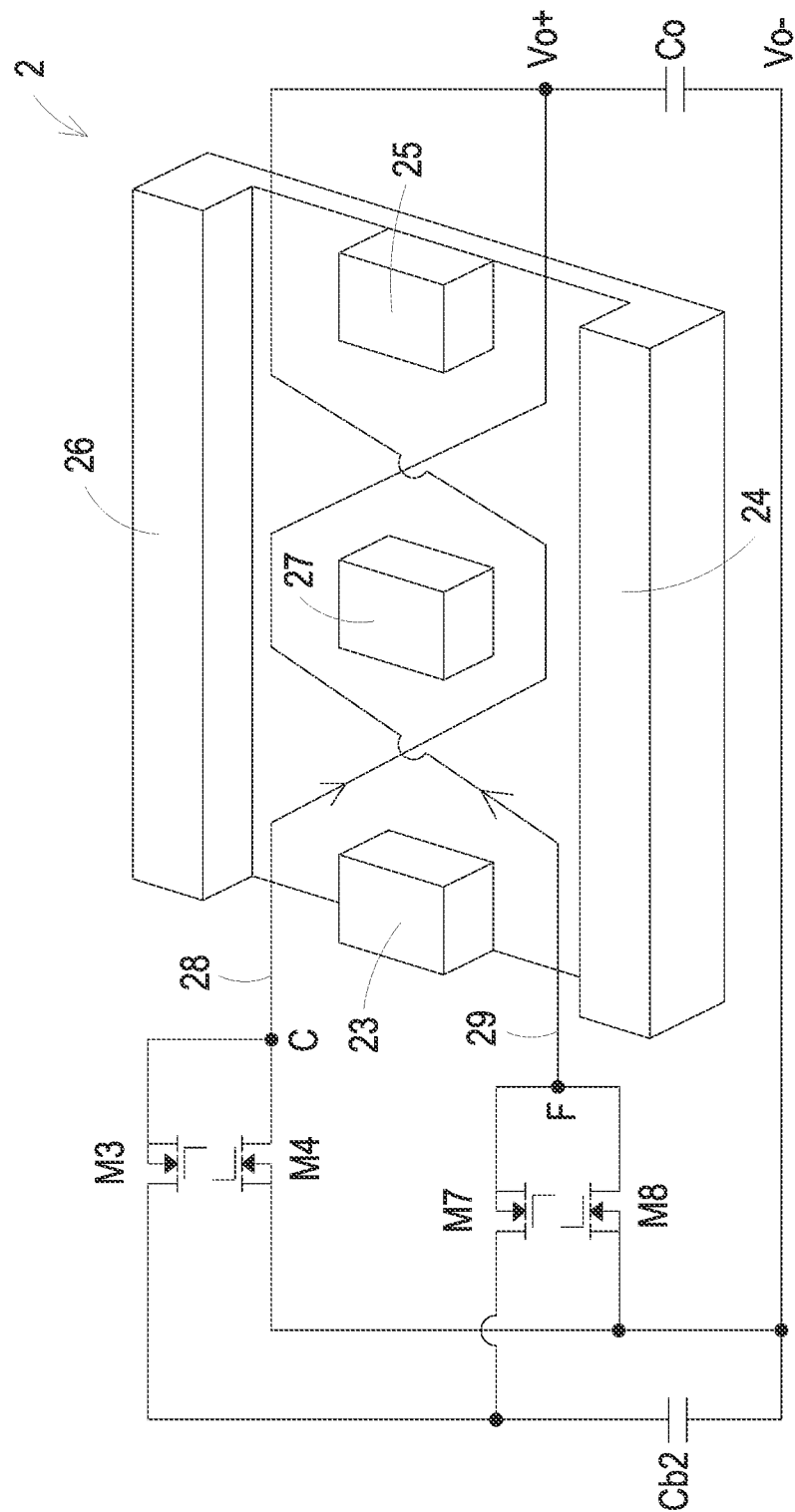
FIG. 9 schematically illustrates the magnetic device and associated switches of the power conversion circuit as shown in FIG. 7, in which the first magnetic cover is not shown.

FIG. 8 is a schematic exploded view illustrating a portion of a magnetic device of the power conversion circuit as shown in FIG. 7. FIG. 9 schematically illustrates the magnetic device and associated switches of the power conversion circuit as shown in FIG. 7, in which the first magnetic cover is not shown. The magnetic device 2 is used as the coupled inductor of the power conversion circuit 1b. For succinctness, the winding assembly of the magnetic device 2 is not shown in FIG. 8, and the first magnetic cover is not shown in FIG. 9.

As shown in FIGS. 8 and 9, the magnetic device 2 includes a first magnetic cover 21, a second magnetic cover 22, a first magnetic leg 23, a second magnetic leg 24, a third magnetic leg 25, a fourth magnetic leg 26, a fifth magnetic leg 27, a first winding 28 and a second winding 29. The first magnetic cover 21 and the second magnetic cover 22 are opposed to each other. The first magnetic leg 23, the second magnetic leg 24, the third magnetic leg 25, the fourth magnetic leg 26 and the fifth magnetic leg 27 are arranged between the first magnetic cover 21 and the second magnetic cover 22. The first magnetic leg 23 and the third magnetic leg 25 are respectively arranged on the two opposite sides of the magnetic device 2. The second magnetic leg 24 and the fourth magnetic leg 26 are respectively arranged on the other two opposed sides of the magnetic device 2. Moreover, the first magnetic leg 23 and the third magnetic leg 25 are arranged between the second magnetic leg 24 and the fourth magnetic leg 26. In addition, the first magnetic leg 23, the second magnetic leg 24, the third magnetic leg 25, the fourth magnetic leg 26 are arranged around the fifth magnetic leg 27.

Please refer to FIG. 9. The input terminal of the first winding 28 is connected with the third node C (i.e., the drain terminal of the fourth switch M4). In addition, the input terminal of the first winding 28 is located beside the first magnetic leg 23 and the fourth magnetic leg 26. The output terminal of the first winding 28 is connected with the output positive terminal Vo+. In addition, the output terminal of the first winding 28 is located beside the third magnetic leg 25 and the fourth magnetic leg 26. The first winding 28 is sequentially transported through the region between the first magnetic leg 23 and the fourth magnetic leg 26, the region between the first magnetic leg 23 and the fifth magnetic leg 27, the region between the fifth magnetic leg 27 and the second magnetic leg 24, the region between the fifth magnetic leg 27 and the third magnetic leg 25 and the region between the third magnetic leg 25 and the fourth magnetic leg 26 from the input terminal to the output terminal.

The input terminal of the second winding 29 is connected with the sixth node F (that is, the drain terminal of the eighth switch M8). In addition, the input terminal of the second winding 29 is located beside the first magnetic leg 23 and the second magnetic leg 24. The output terminal of the second winding 29 is connected with the output positive terminal Vo+. In addition, the output terminal of the second winding 29 is located beside the second magnetic leg 24 and the third magnetic leg 25. The second winding 29 is sequentially transported through the region between the first magnetic leg 23 and the second magnetic leg 24, the region between the first magnetic leg 23 and the fifth magnetic leg 27, the region between the fifth magnetic leg 27 and the fourth magnetic leg 26, the region between the fifth magnetic leg 27 and the third magnetic leg 25 and the region between the third magnetic leg 25 and the second magnetic leg 24 from the input terminal to the output terminal. The output negative terminal Vo− is connected with the source terminal of the fourth switch M4 and the source terminal of the eighth switch M8.

In case that the direction of the current flowing through the first winding 28 and the direction of the current flowing through the second winding 29 are identical, the DC current in the first winding 28 flows from the input terminal of the first winding 28 to the output terminal of the first winding 28, and the DC current in the second winding 29 flows from the input terminal of the second winding 29 to the output terminal of the second winding 29.

In an embodiment, each of the second magnetic leg 24 and the fourth magnetic leg 26 has an air gap or a larger air gap, and each of the first magnetic leg 23, the third magnetic leg 25 and the fifth magnetic leg 27 has no air gap or has a smaller air gap. In an embodiment, the magnetic resistance of the second magnetic leg 24 and the magnetic resistance of the fourth magnetic leg 26 are nearly equal. The magnetic resistance of each of the second magnetic leg 24 and the fourth magnetic leg 26 is larger than three times the magnetic resistance of each of the first magnetic leg 23, the third magnetic leg 25 and the fifth magnetic leg 27. The magnetic resistance of the first magnetic leg 23 and the magnetic resistance of the third magnetic leg 25 are nearly equal. The magnetic resistance of each of the first magnetic leg 23 and the third magnetic leg 25 is nearly equal to two times the magnetic resistance of the fifth magnetic leg 27.

A first voltage is formed between the input terminal and the output terminal of the first winding 28. A second voltage is formed between the input terminal and the output terminal of the second winding 29. Moreover, the phase difference between the first voltage and the second voltage is 180 degrees. A half of the AC magnetic flux generated by the first winding 28 and a half of magnetic flux generated by the second winding 29 are cancelled out and transferred through the fifth magnetic leg 27. The AC magnetic flux passing through the fifth magnetic leg 27 is evenly distributed to the first magnetic leg 23 and the third magnetic leg 25. The directions of the AC magnetic fluxes passing through the first magnetic leg 23 and the third magnetic leg 25 are opposite to the direction of the AC magnetic flux passing through the fifth magnetic leg 27. Consequently, the AC magnetic fluxes passing through the first magnetic leg 23, the third magnetic leg 25 and the fifth magnetic leg 27 are large, but the DC magnetic fluxes are zero. A half of the AC magnetic flux generated by the first winding 28 and a half of magnetic flux generated by the second winding 29 are superposed and transferred through the second magnetic leg 24 and the fourth magnetic leg 26. The direction of the AC magnetic flux passing through the second magnetic leg 24 and the direction of the AC magnetic flux passing through the fourth magnetic leg 26 are opposite. Consequently, the DC magnetic fluxes passing the second magnetic leg 24 and the fourth magnetic leg 26 are large, but the AC magnetic fluxes are small.

As mentioned above, the AC magnetic flux passing through the fifth magnetic leg 27 is large, but the air gap and the magnetic resistance of the fifth magnetic leg 27 are small. When compared with the fifth magnetic leg 27, the air gap and the magnetic resistance of the second magnetic leg 24 are larger. Since the AC magnetic flux passing through the second magnetic leg 24 is smaller, the ripple of the AC current of the first winding 28 is lower. Similarly, the AC magnetic flux passing through the fifth magnetic leg 25 is large, but the air gap and the magnetic resistance of the fifth magnetic leg 25 are small. When compared with the fifth magnetic leg 25, the air gap and the magnetic resistance of the fourth magnetic leg 26 are larger. Since the AC magnetic flux passing through the fourth magnetic leg 26 is smaller, the ripple of the AC current of the second winding 29 is lower. In this embodiment, the power conversion circuit 1b uses the magnetic device 2 as the coupled inductor. As a consequence, the ripple of the first winding 28 and the second winding 29 are small, and the equivalent inductance is large. After the AC magnetic flux passes through the fifth magnetic leg 27, the AC magnetic flux is evenly distributed to the first magnetic leg 23 and the third magnetic leg 25. Under this circumstance, the thinner magnetic covers can be used as the magnetic covers of the magnetic device 2 of the power conversion circuit 1b. Consequently, the power loss of magnetic device 2 is small, and the volume of the magnetic device 2 is reduced.

Figure 10:
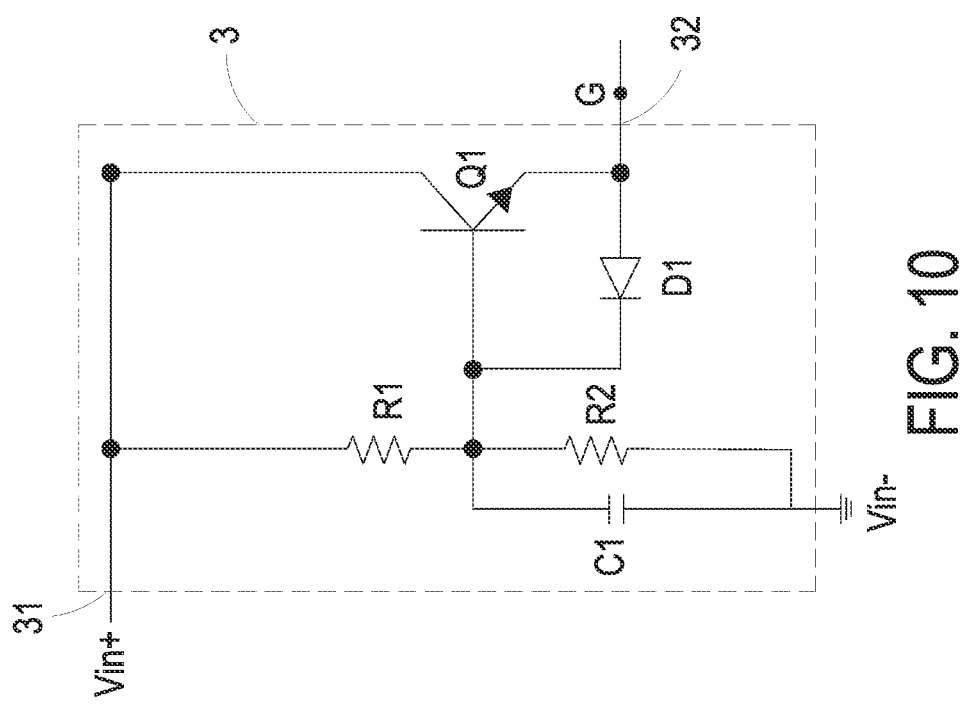
FIG. 10 is a schematic circuit diagram illustrating a pre-charging circuit for the power conversion circuit as shown in FIG. 1.

However, while the output voltage is started and the driving signals are activated to drive the corresponding switches, the first half-bridge capacitor Cb1, the second half-bridge capacitor Cb2, the first resonant capacitor Cr1 and the second resonant capacitor Cr2 may be attacked by inrush currents. For avoiding the influence of the inrush currents on these capacitors, a pre-charging circuit is needed. FIG. 10 is a schematic circuit diagram illustrating a pre-charging circuit for the power conversion circuit as shown in FIG. 1. As shown in FIG. 10, the pre-charging circuit 3 includes an input terminal 31, an output terminal 32, a first resistor R1, a second resistor R2, a capacitor C1, a transistor Q1 and a diode D1. The input terminal 31 of the pre-charging circuit 3 is connected with the input positive terminal Vin+. The output terminal 32 of the pre-charging circuit is connected with the seventh node G. The first terminal of the first resistor R1 is connected with the input terminal 31 of the pre-charging circuit 3. The second terminal of the first resistor R1 is connected with the first terminal of the second resistor R2. The second terminal of the second resistor R2 is connected with the input negative terminal Vin−. Moreover, the resistance of the first resistor R1 and the resistance of the second resistor R2 are equal. The first terminal of the capacitor C1 is connected with the second terminal of the first resistor R1 and the first terminal of the second resistor R2. The second terminal of the capacitor C1 is connected with the input negative terminal Vin−. Preferably but not exclusively, the transistor Q1 is a current amplifying transistor or a field effect transistor. The first terminal of the transistor Q1 is connected with the input terminal 31 of the pre-charging circuit 3. The second terminal of the transistor Q1 is connected with the second terminal of the first resistor R1 and the first terminal of the second resistor R2. The third terminal of the transistor Q1 is connected with the output terminal 32 of the pre-charging circuit 3. Preferably but not exclusively, the diode D1 is a clamping diode. The cathode of the diode D1 is connected with the second terminal of the first resistor R1 and the first terminal of the second resistor R2. The anode of the diode D1 is connected with the output terminal 32 of the pre-charging circuit 3.

As mentioned above, the resistance of the first resistor R1 and the resistance of the second resistor R2 are equal. While the input voltage Vin is increased, the input voltage of the transistor Q1 (i.e., the voltage at the midpoint of the first resistor R1 and the second resistor R2) is increased and the output voltage of the transistor Q1 is also increased. When each of the input voltage and the output voltage of the transistor Q1 is increased to a half of the input voltage Vin, the pre-charging operation of the pre-charging circuit 3 is completed. Meanwhile, each of the first half-bridge capacitor Cb1, the second half-bridge capacitor Cb2, the first resonant capacitor Cr1 and the second resonant capacitor Cr2 is charged to a half of the input voltage Vin. Then, the power conversion circuit 1 generates the driving signals to drive the corresponding switches. Consequently, the output voltage of the power conversion circuit 1 starts to rise from zero. In this way, the first half-bridge capacitor Cb1, the second half-bridge capacitor Cb2, the first resonant capacitor Cr1 and the second resonant capacitor Cr2 will not be attacked by inrush currents during the process of start driving the switches. That is, the inrush current can be controlled by the pre-charging circuit 3.

Figure 11:
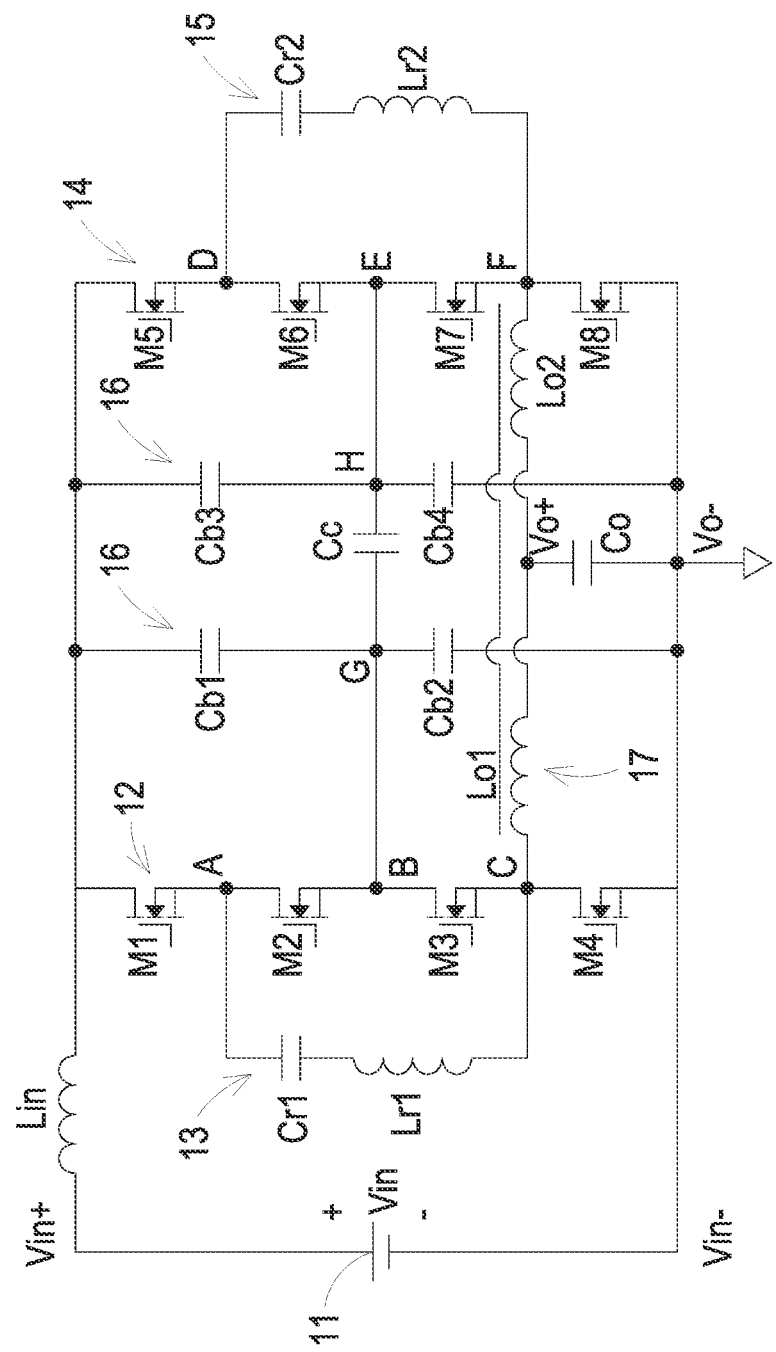
FIG. 11 is a schematic circuit diagram illustrating a power conversion circuit according to a fourth embodiment of the present disclosure.

FIG. 11 is a schematic circuit diagram illustrating a power conversion circuit according to a fourth embodiment of the present disclosure. The circuitry topology of the power conversion circuit 1c of this embodiment is similar to that of the power conversion circuit 1 as shown in FIG. 1. In comparison with the power conversion circuit 1 of FIG. 1, the capacitor branch 16 in the power conversion circuit 1c of this embodiment includes a first half-bridge capacitor Cb1, a second half-bridge capacitor Cb2, a third half-bridge capacitor Cb3 and a fourth half-bridge capacitor Cb4. The first half-bridge capacitor Cb1 and the second half-bridge capacitor Cb2 are connected in series between the second terminal of the input inductor Lin and the input negative terminal Vin−. The third half-bridge capacitor Cb3 and the fourth half-bridge capacitor Cb4 are also connected in series between the second terminal of the input inductor Lin and the input negative terminal Vin−. The first half-bridge capacitor Cb1 and the second half-bridge capacitor Cb2 are connected with the seventh node G. The third half-bridge capacitor Cb3 and the fourth half-bridge capacitor Cb4 are connected with an eighth node H. The seventh node G and the second node B are directly connected with each other. The eighth node H and the fifth node E are directly connected with each other. In this embodiment, the power conversion circuit 1c further includes a blocking capacitor Cc. The blocking capacitor Cc is connected between the seventh node G and the eighth node H.

Due to the above circuitry topology and the arrangement of the blocking capacitor Cc, the current-sharing efficacy of the first output inductor Lo1 and the second output inductor Lo2 can be achieved. Consequently, even if the currents flowing through the two windings of the coupled inductor are not even, the saturation problem caused by the DC magnetic fluxes of the three magnetic legs (e.g., the first magnetic leg 23, the third magnetic leg 25 and the fifth magnetic leg 27 as shown in FIGS. 8 and 9) can be avoided.

In some embodiments, the power conversion circuit 1c further includes two pre-charging circuits. Consequently, the first half-bridge capacitor Cb1, the second half-bridge capacitor Cb2, the first resonant capacitor Cr1 and the second resonant capacitor Cr2 will not be attacked by inrush currents. The input terminals of the two pre-charging circuits are connected with the input positive terminal Vin+. The output terminal of the one pre-charging circuit is connected with the seventh node G. The output terminal of the other pre-charging circuit is connected with the eighth node H. The circuitry topology of each of the two pre-charging circuits are similar to that of FIG. 10, and not redundantly described herein.

In some embodiments, the connection relationships between the first half-bridge capacitor and the second half-bridge capacitor of the capacitor branch and associated components are altered.

Figure 12:
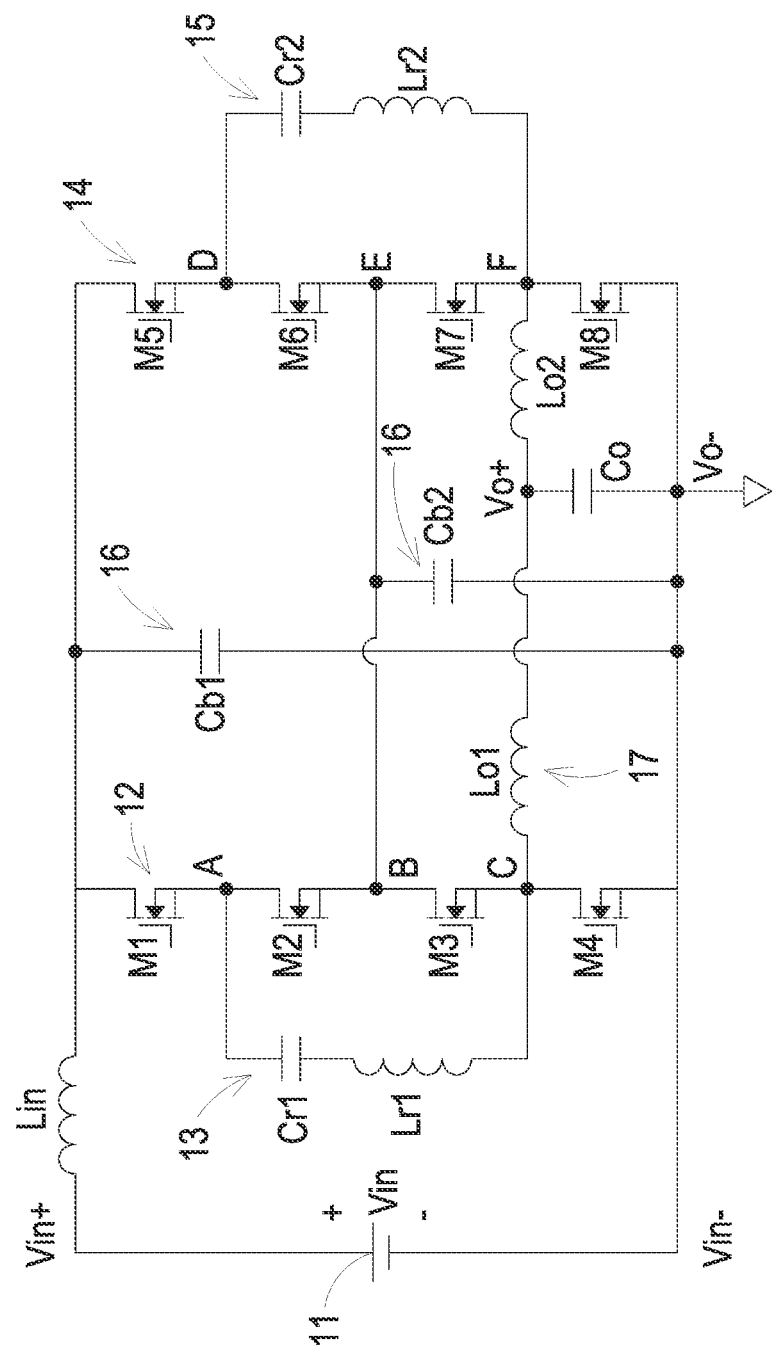
FIG. 12 is a schematic circuit diagram illustrating a power conversion circuit according to a fifth embodiment of the present disclosure.

FIG. 12 is a schematic circuit diagram illustrating a power conversion circuit according to a fifth embodiment of the present disclosure. As shown in FIG. 12, the power conversion circuit 1d of this embodiment is similar to the power conversion circuit 1 as shown in FIG. 1. In comparison with the power conversion circuit 1 of FIG. 1, the connection relationships between the first half-bridge capacitor and the second half-bridge capacitor of the capacitor branch and associated components in the power conversion circuit 1d of this embodiment are distinguished. In this embodiment, the first half-bridge capacitor Cb1 is connected between the second terminal of the input inductor Lin and the input negative terminal Vin−. The first terminal of the second half-bridge capacitor Cb2 is connected between the second node B and the fifth node E. The second terminal of the second half-bridge capacitor Cb2 is connected with the input negative terminal Vin−.

From the above descriptions, the present disclosure provides the power conversion circuit. The power conversion circuit includes the first resonant inductor and the second resonant inductor. The branch current of the first resonant branch and the branch current of the second resonant branch start to rise from zero in the forward or reverse direction. Consequently, the purposes of turning on the first switch and the second switch of the first switch bridge arm under the zero current condition are achieved, and the purposes of turning on the fifth switch and the sixth switch of the second switch bridge arm under the zero current condition are achieved. In this way, the turn-on loss of the first switch bridge arm and the second switch bridge arm will be reduced. When the amplitude of the current flowing through the first resonant branch is decreased to be close to zero, the first switch or the second switch is turned off. Moreover, when the amplitude of the current flowing through the second resonant branch is decreased to be close to zero, the fifth switch or the sixth switch is turned off. Consequently, the purposes of turning off the first switch and the second switch of the first switch bridge arm under the zero current condition are achieved, and the purposes of turning off the fifth switch and the sixth switch of the second switch bridge arm under the zero current condition are achieved. In this way, the turn-off loss of the first switch bridge arm and the second switch bridge arm will be reduced.

As mentioned above, the first resonant branch includes the first resonant inductor. Consequently, the capacitors with high capacitance can be used as the first half-bridge capacitor and the second half-bridge capacitor. In addition, the first resonant branch will not generate the inrush current when the on/off states of the switches are changed. Since the first half-bridge capacitor and the second half-bridge capacitor have the large capacitance, the first half-bridge capacitor and the second half-bridge capacitor can effectively provide the voltage clamping function to the first switch, the second switch, the third switch and the fourth switch.

Similarly, the second resonant branch includes the second resonant inductor. Consequently, the capacitors with high capacitance can be used as the first half-bridge capacitor and the second half-bridge capacitor. In addition, the second resonant branch will not generate the inrush current when the on/off states of the switches are changed. Since the first half-bridge capacitor and the second half-bridge capacitor have the large capacitance, the first half-bridge capacitor and the second half-bridge capacitor can effectively provide the voltage clamping function to the fifth switch, a sixth switch, a seventh switch and an eighth switch. Consequently, the switches with the low rated voltages can be used as the switches of the first switch bridge arm and the switches of the second switch bridge arm. Since the conduction loss of the switches is reduced, the power loss of the power conversion circuit is reduced, and the efficiency is enhanced.

Moreover, two voltage reduction approaches can be achieved. In the first voltage reduction approach, the magnitude of the output voltage Vo is lower than or equal to 0.25×Vin. In the second voltage reduction approach, the magnitude of the output voltage Vo is higher than 0.25×Vin. Consequently, the gain range of the power conversion circuit is wide. Moreover, even if the range of the input voltage Vin is wider, the output voltage Vo is still stabilized.

While the disclosure has been described in terms of what is presently considered to be exemplary embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising:
an input positive terminal, an input negative terminal, an output positive terminal and an output negative terminal, wherein the input negative terminal is electrically connected with the output negative terminal;
a first switch bridge arm electrically connected between the input positive terminal and the input negative terminal, wherein the first switch bridge arm comprises a first switch, a second switch, a third switch and a fourth switch, which are electrically connected with each other in series, wherein the first switch and the second switch are electrically connected with a first node, the second switch and the third switch are electrically connected with a second node, and the third switch and the fourth switch are electrically connected with a third node;
a first resonant branch electrically connected between the first node and the third node, wherein the first resonant branch comprises a first resonant capacitor and a first resonant inductor, which are connected with each other in series;
a capacitor branch electrically connected with the first switch bridge arm in parallel;
an output inductor unit comprising a first output inductor, wherein the first output inductor is electrically connected with the third node and the output positive terminal; and
an output capacitor electrically connected between the output positive terminal and the output negative terminal.

2. The power conversion circuit according to claim 1, wherein the first switch and the third switch are controlled according to a first driving signal, so that the first switch and the third switch are turned on and turned off synchronously, the fourth switch is controlled according to a second driving signal, and the second switch is controlled according to a third driving signal, wherein a duty cycle of the first driving signal is lower than or equal to 50%, the second driving signal and the first driving signal are complementary to each other, a duty cycle of the third driving signal is lower than or equal to 50%, and a phase difference between the third driving signal and the first driving signal is 180 degrees.

3. The power conversion circuit according to claim 1, wherein the third switch is controlled according to a first driving signal, the second switch and the fourth switch are controlled according to a second driving signal, so that the second switch and the fourth switch are turned on and turned off synchronously, and the first switch is controlled according to a fourth driving signal, wherein a duty cycle of the first driving signal is larger than 50%, the second driving signal and the first driving signal are complementary to each other, and a phase difference between the fourth driving signal and the second driving signal is 180 degrees.

4. The power conversion circuit according to claim 1, wherein the first switch and the third switch are controlled according to a first driving signal, so that the first switch and the third switch are turned on and turned off synchronously, and the second switch and the fourth switch are controlled according to a second driving signal, so that the second switch and the fourth switch are turned on and turned off synchronously, wherein the first driving signal has a duty cycle, and the second driving signal and the first driving signal are complementary to each other.

5. The power conversion circuit according to claim 2, wherein the power conversion circuit receives an input voltage through the input positive terminal and the input negative terminal, and the power conversion circuit outputs an output voltage through the output positive terminal and the output negative terminal, wherein a voltage at a seventh node of the capacitor branch is equal to 0.5 times the input voltage, and the output voltage is equal to the voltage at the seventh node times the duty cycle of the first driving signal.

6. The power conversion circuit according to claim 1, wherein the power conversion circuit further comprises:
a second switch bridge arm electrically connected between the input positive terminal and the input negative terminal, and electrically connected with the first switch bridge arm in parallel, wherein the second switch bridge arm comprises a fifth switch, a sixth switch, a seventh switch and an eighth switch, which are electrically with each other in series, wherein the fifth switch and the sixth switch are connected with a fourth node, the sixth switch and the seventh switch are electrically connected with a fifth node, and the seventh switch and the eighth switch are connected with a sixth node; and
a second resonant branch electrically connected between the fourth node and the sixth node, wherein the second resonant branch comprises a second resonant capacitor and a second resonant inductor, which are connected with each other in series.

7. The power conversion circuit according to claim 6, wherein the capacitor branch comprises a first half-bridge capacitor and a second half-bridge capacitor, which are electrically connected with each other in series, wherein the first half-bridge capacitor and the second half-bridge capacitor are electrically connected with a seventh node, and the seventh node, the second node and the fifth node are directly connected with each other.

8. The power conversion circuit according to claim 6, wherein the first switch, the third switch and the sixth switch are controlled according to a first driving signal, so that the first switch, the third switch and the sixth switch are turned on and turned off synchronously, the fourth switch is controlled according to a second driving signal, the second switch, the fifth switch and the seventh switch are controlled according to a third driving signal, so that the second switch, the fifth switch and the seventh switch are turned on and turned off synchronously, and the eighth switch is controlled according to a fourth driving signal, wherein a duty cycle of the first driving signal is lower than or equal to 50%, the second driving signal and the first driving signal are complementary to each other, a duty cycle of the third driving signal is lower than or equal to 50%, the fourth driving signal and the third driving signal are complementary to each other, and a phase difference between the third driving signal and the first driving signal is 180 degrees.

9. The power conversion circuit according to claim 6, wherein the third switch is controlled according to a first driving signal, the second switch, the fourth switch and the fifth switch are controlled according to a second driving signal, so that the second switch, the fourth switch and the fifth switch are turned on and turned off synchronously, the seventh switch is controlled according to a third driving signal, and the first switch, the sixth switch and the eighth switch are controlled according to a fourth driving signal, so that the first switch, the sixth switch and the eighth switch are turned on and turned off synchronously, wherein a duty cycle of the first driving signal is larger than 50%, the second driving signal and the first driving signal are complementary to each other, a duty cycle of the third driving signal is larger than 50%, the fourth driving signal and the third driving signal are complementary to each other, and a phase difference between the fourth driving signal and the second driving signal is 180 degrees.

10. The power conversion circuit according to claim 6, wherein the first switch and the third switch are controlled according to a first driving signal, so that the first switch and the third switch are turned on and turned off synchronously, the second switch and the fourth switch are controlled according to a second driving signal, so that the second switch and the fourth switch are turned on and turned off synchronously, the fifth switch and the seventh switch are controlled according to a third driving signal, so that the fifth switch and the seventh switch are turned on and turned off synchronously, and the sixth driving signal and the eighth driving signal are controlled according to a fourth driving signal, so that the sixth switch and the eighth switch are turned on and turned off synchronously, wherein the first driving signal has a first duty cycle, the second driving signal and the first driving signal are complementary to each other, the third driving signal has a second duty cycle, the fourth driving signal and third driving signal are complementary to each other, and a phase difference between the third driving signal and the first driving signal is 180 degrees.

11. The power conversion circuit according to claim 8, wherein the power conversion circuit receives an input voltage through the input positive terminal and the input negative terminal, and the power conversion circuit outputs an output voltage through the output positive terminal and the output negative terminal, wherein a voltage at a seventh node of the capacitor branch is equal to 0.5 times the input voltage, and the output voltage is equal to the voltage at the seventh node times the duty cycle of the first driving signal.

12. The power conversion circuit according to claim 6, wherein the capacitor branch comprises a first half-bridge capacitor and a second half-bridge capacitor, wherein the first half-bridge capacitor is electrically connected between the input positive terminal and the output negative terminal, a first terminal of the second half-bridge capacitor is electrically connected with the second node and the fifth node, and a second terminal of the second half-bridge capacitor is electrically connected with the input negative terminal.

13. The power conversion circuit according to claim 6, wherein the output inductor unit further comprises a second output inductor, wherein the second output inductor is electrically connected between the sixth node and the output positive terminal.

14. The power conversion circuit according to claim 13, wherein the first output inductor and the second output inductor are coupled as a coupled inductor;
wherein a phase difference between a voltage at the third node and a voltage at the sixth node is 180 degrees.

15. The power conversion circuit according to claim 14, wherein the coupled inductor comprises a magnetic device, and the magnetic device comprises a first magnetic cover, a second magnetic cover, a first magnetic leg, a second magnetic leg, a third magnetic leg, a fourth magnetic leg, a fifth magnetic leg, a first winding and a second winding, wherein the first magnetic cover and the second magnetic cover are opposed to each other, the first magnetic leg, the second magnetic leg, the third magnetic leg, the fourth magnetic leg and the fifth magnetic leg are arranged between the first magnetic cover and the second magnetic cover, the first magnetic leg and the third magnetic leg are respectively arranged on the two opposite sides of the magnetic device, the second magnetic leg and the fourth magnetic leg are respectively arranged on the other two opposed sides of the magnetic device, and the fifth magnetic leg is arranged between the first magnetic leg and the third magnetic leg, wherein an input terminal of the first winding is connected with the third node, and the input terminal of the first winding is located beside the first magnetic leg and the fourth magnetic leg, wherein an output terminal of the first winding is connected with the output positive terminal, and the output terminal of the first winding is located beside the third magnetic leg and the fourth magnetic leg, wherein an input terminal of the second winding is connected with the sixth node, and the input terminal of the second winding is located beside the first magnetic leg and the second magnetic leg, wherein an output terminal of the second winding is connected with the output positive terminal, and the output terminal of the second winding are located beside the second magnetic leg and the third magnetic leg.

16. The power conversion circuit according to claim 15, wherein the first winding is sequentially transported through a region between the first magnetic leg and the fourth magnetic leg, a region between the first magnetic leg and the fifth magnetic leg, a region between the fifth magnetic leg and second magnetic leg, a region between the fifth magnetic leg and the third magnetic leg and a region between the third magnetic leg and the fourth magnetic leg from the input terminal to the output terminal, wherein the second winding is sequentially transported through a region between the first magnetic leg and the second magnetic leg, the region between the first magnetic leg and the fifth magnetic leg, a region between the fifth magnetic leg and the fourth magnetic leg, the region between the fifth magnetic leg and the third magnetic leg and a region between the third magnetic leg and the second magnetic leg from the input terminal to the output terminal.

17. The power conversion circuit according to claim 15, wherein a magnetic resistance of the second magnetic leg and a magnetic resistance of the fourth magnetic leg are equal, and a magnetic resistance of the first magnetic leg and a magnetic resistance of the third magnetic leg are equal, wherein the magnetic resistance of each of the second magnetic leg and the fourth magnetic leg is larger than three times the magnetic resistance of the first magnetic leg, or larger than three times the magnetic resistance of the third magnetic leg, or larger than three times the magnetic resistance of the fifth magnetic leg, wherein the magnetic resistance of each of the first magnetic leg and the third magnetic leg is two times the magnetic resistance of the fifth magnetic leg.

18. The power conversion circuit according to claim 15, wherein a first voltage across the input terminal and the output terminal of the first winding, and there is a second voltage across the input terminal and the output terminal of the second winding, wherein a phase difference between the first voltage and the second voltage is 180 degrees.

19. The power conversion circuit according to claim 6, wherein the capacitor branch comprises a first half-bridge capacitor, a second half-bridge capacitor, a third half-bridge capacitor and a fourth half-bridge capacitor, wherein the first half-bridge capacitor and the second half-bridge capacitor are electrically connected in series between the input positive terminal and the input negative terminal, and the third half-bridge capacitor and the fourth half-bridge capacitor are electrically connected in series between the input positive terminal and the input negative terminal, wherein the first half-bridge capacitor and the second half-bridge capacitor are connected with a seventh node, and the third half-bridge capacitor and the fourth half-bridge capacitor are electrically connected with an eighth node, wherein the seventh node and the second node are directly connected with each other, and the eighth node and the fifth node are directly connected with each other, wherein the power conversion circuit further comprises a blocking capacitor, and the blocking capacitor is connected between the seventh node and the eighth node.

20. The power conversion circuit according to claim 6, wherein the power conversion circuit further comprises an input inductor, wherein a first terminal of the input inductor is connected with the input positive terminal, and a second terminal of the input inductor is electrically connected with the first switch bridge arm, the second switch bridge arm and the capacitor branch;

wherein the power conversion circuit further comprises a pre-charging circuit, wherein an input terminal of the pre-charging circuit is electrically connected with the input positive terminal, and an output terminal of the pre-charging circuit is electrically connected with a seventh node of the capacitor branch.

\* \* \* \* \*